(12) United States Patent
Hahn et al.

(10) Patent No.: US 11,816,622 B2
(45) Date of Patent: Nov. 14, 2023

(54) SYSTEM AND METHOD FOR RATING OF PERSONNEL USING CROWDSOURCING IN COMBINATION WITH WEIGHTED EVALUATOR RATINGS

(71) Applicant: ScoutZinc, LLC, Gainesville, FL (US)

(72) Inventors: David Worthington Hahn, Gainesville, FL (US); Alexander Jerome Willis, Gainesville, FL (US)

(73) Assignee: ScoutZinc, LLC, Gainesville, FL (US)

( * ) Notice: Subject to any disclaimer, the term of this patent is extended or adjusted under 35 U.S.C. 154(b) by 0 days.

(21) Appl. No.: 15/676,648

(22) Filed: Aug. 14, 2017

(65) Prior Publication Data

US 2019/0050782 A1 Feb. 14, 2019

(51) Int. Cl.
*G06Q 10/0639* (2023.01)
*G06Q 50/00* (2012.01)

(52) U.S. Cl.
CPC ....... *G06Q 10/06398* (2013.01); *G06Q 50/01* (2013.01)

(58) Field of Classification Search
CPC .......................... G06Q 10/06398; G06Q 50/01
(Continued)

(56) References Cited

U.S. PATENT DOCUMENTS 6,892,178 B1 * 5/2005 Zacharia ................ G06Q 10/04
705/7.29
6,892,179 B1 * 5/2005 Zacharia ................ G06Q 10/04
705/4

(Continued)

FOREIGN PATENT DOCUMENTS

KR   20110009302 A  *  1/2011
KR   20160133835 A  *  11/2016  .......... F16C 32/0429
(Continued)

OTHER PUBLICATIONS

Radicchi, Elena, et al., Social Talent Scouting: A New Opportunity for the Identification of Football Players?, Physical Culture and Sport Studies and Research, pp. 28-43, vol. LXX, 2016. (Year: 2016).*

(Continued)

*Primary Examiner* — Jerry O'Connor
*Assistant Examiner* — Thomas Yih Ho
(74) *Attorney, Agent, or Firm* — John L. DeAngelis; Wolter, Van Dyke, Davis, PLLC

(57) ABSTRACT

Personnel evaluation based on crowdsourcing concepts. An approach to personnel evaluation is described that uses crowd-sourced data and an iterative approach. Individual personnel evaluators are themselves evaluated and assigned weighting factors based on their acumen and accuracy with regard to personnel evaluation. Personnel evaluations are provided by each personnel evaluator, who collectively form a crowdsourcing crowd, and weighted according to each evaluator's assigned weighting factor. The crowd-sourced weighted-averages from all evaluators are combined and used periodically and iteratively to evaluate the individual crowdsourcing participants and to re-calculate their individual weighting factors. The approach provides more accurate and more directed personnel evaluations as compared to simple arithmetic averaging of crowd-sourced data, and is improved with each iteration over time.

24 Claims, 12 Drawing Sheets

(58) Field of Classification Search
USPC .......................................................... 705/7.38
See application file for complete search history.

(56) References Cited

U.S. PATENT DOCUMENTS

| | | | |
|---|---|---|---|
| 6,895,385 B1 * | 5/2005 | Zacharia | G06Q 10/04 |
| | | | 705/7.29 |
| 8,380,554 B2 | 2/2013 | Vojnovic | |
| 8,412,568 B2 | 4/2013 | Bastos | |
| 8,516,533 B2 | 8/2013 | Davis | |
| 8,554,605 B2 | 10/2013 | Oleson | |
| 8,626,545 B2 | 1/2014 | Van Pelt | |
| 8,635,197 B2 | 1/2014 | Chaturvedi | |
| 8,639,764 B2 | 1/2014 | Rao | |
| 8,794,971 B2 | 8/2014 | Feng | |
| 8,831,403 B2 | 9/2014 | Patil | |
| 8,852,000 B1 | 10/2014 | Rhinesmith | |
| 8,875,131 B2 | 10/2014 | Shae | |
| 8,909,475 B2 | 12/2014 | Gishen | |
| 8,949,204 B2 | 2/2015 | Chaturvedi | |
| 8,972,400 B1 | 3/2015 | Kapczynski | |
| 8,977,761 B2 | 3/2015 | Thomas | |
| 9,033,781 B2 | 5/2015 | Steir | |
| 9,082,084 B2 | 7/2015 | Ogilvie | |
| 9,098,343 B2 | 8/2015 | Celis | |
| 9,152,990 B1 | 10/2015 | Kanter | |
| 9,171,261 B1 | 10/2015 | Zadeh | |
| 9,171,265 B1 | 10/2015 | Lathia | |
| 9,195,842 B2 | 11/2015 | Zang | |
| 9,195,910 B2 | 11/2015 | Garera | |
| 9,235,652 B1 | 1/2016 | Jeffrey | |
| 9,254,092 B2 | 2/2016 | Albert | |
| 9,258,764 B2 | 2/2016 | Rahmati | |
| 9,280,610 B2 | 3/2016 | Gruber | |
| 9,285,231 B2 | 3/2016 | Jouaux | |
| 9,313,083 B2 | 4/2016 | Chlaochharia | |
| 9,325,806 B2 | 4/2016 | Bapst | |
| 9,330,420 B2 | 5/2016 | Bao | |
| 9,364,761 B1 | 6/2016 | Rhinesmith | |
| 9,383,976 B1 | 7/2016 | Singh | |
| 9,384,587 B2 | 7/2016 | Davison | |
| 9,386,108 B1 | 7/2016 | Waite | |
| 9,395,190 B1 | 7/2016 | Young | |
| 9,411,917 B2 | 8/2016 | Gil | |
| 9,424,533 B1 | 8/2016 | Zadeh | |
| 9,426,190 B1 | 8/2016 | Mccurley | |
| 9,436,918 B2 | 9/2016 | Pantel | |
| 9,438,619 B1 | 9/2016 | Chan | |
| 9,448,993 B1 | 9/2016 | Bragga | |
| 9,460,419 B2 | 10/2016 | Tu | |
| 9,491,655 B2 | 11/2016 | Gao | |
| 9,510,154 B2 | 11/2016 | Mori | |
| 9,519,756 B2 | 12/2016 | Bitran | |
| 9,532,086 B2 | 12/2016 | Byers | |
| 9,568,328 B1 | 2/2017 | Abuelsaad | |
| 9,584,540 B1 | 2/2017 | Chan | |
| 9,589,130 B2 | 3/2017 | Shanklin | |
| 9,594,944 B2 | 3/2017 | Kompalli | |
| 2001/0034734 A1 * | 10/2001 | Whitley | G06Q 10/06 |
| 2007/0078699 A1 * | 4/2007 | Scott | G06Q 10/063 |
| | | | 707/713 |
| 2007/0256093 A1 * | 11/2007 | Hiler | H04N 21/47 |
| | | | 725/28 |
| 2008/0120166 A1 * | 5/2008 | Fernandez | G06Q 30/02 |
| | | | 702/179 |
| 2009/0106236 A1 * | 4/2009 | Koefoot | G06Q 10/10 |
| 2013/0173616 A1 * | 7/2013 | Fekri | G06F 16/284 |
| | | | 707/736 |
| 2013/0268512 A1 * | 10/2013 | Snyder | G06Q 10/06 |
| | | | 707/722 |
| 2014/0074565 A1 * | 3/2014 | Green | G06Q 10/06398 |
| | | | 705/7.42 |
| 2014/0316832 A1 * | 10/2014 | Devlin | G06Q 10/063112 |
| | | | 705/7.14 |
| 2015/0170046 A1 * | 6/2015 | Sugiyama | G06N 5/04 |
| | | | 706/52 |
| 2015/0370801 A1 * | 12/2015 | Shah | G06Q 30/0282 |
| | | | 707/728 |
| 2016/0027129 A1 * | 1/2016 | Pallaghy | G06Q 50/01 |
| | | | 705/319 |
| 2016/0300274 A1 * | 10/2016 | Dolen | G06Q 50/01 |
| 2017/0295194 A1 * | 10/2017 | Zitouni | H04L 63/1408 |

FOREIGN PATENT DOCUMENTS

| | | | | |
|---|---|---|---|---|
| KR | 1020160133835 A | * | 11/2016 | ............ G06Q 50/01 |
| WO | WO-2007101278 A2 | * | 9/2007 | ......... G06Q 10/0639 |

OTHER PUBLICATIONS

Robbins, Naomi. https://www.forbes.com/sites/naomirobbins/2012/01/19/when-should-i-use-logarithmic-scales-in-my-charts-and-graphs/#3d2c7aa75e67. Forbes, Jan. 19, 2012. (Year: 2012).*

English-language translation of KR 1020160133835 A (cited in the foreign patent documents section above) (Year: 2016).*

* cited by examiner

SYSTEM AND METHOD FOR RATING OF PERSONNEL USING CROWDSOURCING IN COMBINATION WITH WEIGHTED EVALUATOR RATINGS

FIELD OF INVENTION

The present invention relates in general to the field of rating of personnel, including the specific use of crowdsourcing concepts, and the general concept of using performance-based weighted-averages of individual evaluators to arrive at an overall rating or set of ratings for the person evaluated, referred to as the evaluee herein.

BACKGROUND

There is a general need to evaluate personnel in a wide range of circumstances, including for example the evaluation of athletes at many performance levels and in many different sports. For example, high school coaches want to evaluate and recruit junior high school or middle school talent; college coaches want to evaluate and recruit high school talent; and professional sports teams want to evaluate and recruit college athletes. This scenario is common among all sports.

Perhaps the greatest challenge with such personnel evaluation is accurately covering the broad range of prospects throughout large geographic areas, such as the United States or even across foreign countries. It is also critical to consider the rating skills, acumen, and biases of individuals conducting the evaluation (referred to as evaluators herein). Undoubtedly some will be more skilled than others in evaluating abilities, and some may be biased for or against certain individuals in the evaluation pool.

Besides athletics, there are other fields where it is desirable to evaluate personnel or to scout for talent. Examples include the music industry, where artists and repertoire (A&R) persons scout for up and coming musicians, or in acting and film, or in the modeling industry. Such examples are not considered limiting of the scope of the present invention.

To assist with personnel evaluation (i.e. talent evaluation), many coaches, athletic directors, recruiters, and the like, utilize what are commonly referred to as "scouts" or "talent scouts". Scouts generally have expertise and/or reside in specific geographic regions with deep knowledge and relationships, relevant to the recruiting prospect and/or the team from which that person is being recruited. These scouts provide evaluations (i.e. personnel ratings or recommendations) to those looking to recruit such persons. There are literally many thousands or tens of thousands of scouts in the United States at all levels of sports and athletics, as well as other fields. A key limitation is that scouts are unable to cover all regions and all players; hence scouts and recruiters may miss players, and players may miss recruitment opportunities. Scouts also have varying abilities to conduct a fair and unbiased evaluation of a prospect.

Given these limitations, it is desirable to have additional means to provide personnel evaluation to interested parties, such as recruiters. One untapped resource involves using local fans, notably those that regularly attend relevant events, to help provide personnel evaluations. For the example of athletics, one such untapped resource involves using sports fans, notably those who regularly attend sporting events, to help provide personnel evaluations.

BRIEF SUMMARY OF THE INVENTION

Employing techniques of the present invention seeks to overcome or at least minimize so the wide range of abilities and biases among evaluators, and in this way, generate a rating that is more accurately indicative of each person's abilities.

In one application, the current invention seeks to leverage the use of sports fans according to a unique system and method, thereby providing a significant and beneficial new approach to personnel evaluation and recruitment that helps both recruiters and recruitees.

As noted in the Background section, there is a general need to evaluate personnel in a wide range of circumstances, including for example the evaluation of athletes at many performance levels. Such evaluations often utilize what are commonly referred to as "scouts", and such scouts generally have subject expertise and may often cover certain geographic regions. A key limitation, however, is that scouts are unable to cover all regions and all players; hence recruiters may miss players, and players may miss recruitment opportunities. Given such scouting limitations, it is desirable to have additional means to provide personnel evaluation to interested parties, such as recruiters, and to provide additional recruitment opportunities to those being evaluated, such as athletes, musicians, or aspiring actors and models.

The current invention provides a solution to the aforementioned limitations of scouting and related personnel evaluation processes by leveraging a new resource that is largely untapped or unleveraged to date. Focusing on the example case of athletics and recruiting athletes, sporting events are universally attended by spectators or fans. Many fans are "regulars", meaning they may follow a specific team, a specific sport, or even attend contests at a specific venue, for example. Such regular fans often develop a deep understanding of a specific sport or event, and often show a high level of commitment to the players, teams, or organizations (e.g. school or league).

Other fans may include a parent, friend or relative of a particular athlete, or a former athlete from a particular program, team or sport. Overall, such fans have a range of knowledge that may not be inconsistent with the knowledge of an aforementioned scout. The current invention seeks to leverage and tap the power of such fans, who are not considered formal "scouts," to assist with personnel evaluation. Thus, the present invention seeks to use actual fans as scouts.

The totality of ratings from all evaluators (e.g., formal scouts, fans, parents) for a so player generates a crowdsourced rating for that player.

The concept of "crowdsourcing" has grown in recent years, and is perhaps most common in the rating of restaurants, hotels, retailers and professional service providers (e.g. physicians or dentists). Merriam-Webster defines crowdsourcing as "the practice of obtaining needed services, ideas, or content by soliciting contributions from a large group of people and especially from the online community, rather than from traditional employees or suppliers."

If one considers the case of crowdsourcing in the context of the current invention, the "traditional employees or suppliers" would be considered traditional talent scouts, for example athletic scouts, often employed by the recruiting entity such as schools or coaches, and the "large group of people" would be considered the aforementioned fans attending the events, for example, athletic events.

One potential drawback of applying simple crowdsourcing techniques and metrics to personnel evaluation, such as evaluation of athletic talent, is the potential disparity of the talent or acumen of the evaluators (e.g., the fans in the "crowd"). For example, a large number of evaluators with varying degrees of talent-rating acumen will result in muddled player evaluation that would tend to average near the mean of the rating scale. Other potential shortcomings include biases for or against a particular evaluated person, for example, a parent or friend might "over rate" a particular player, or a rival might "under rate" a particular player. With these thoughts in mind, it is desirable and even necessary to address and mitigate such shortcomings with any proposed crowdsourcing approach to talent or personnel evaluation.

The current invention describes an approach to crowdsourcing as applied specifically to personnel evaluation, including but not necessarily limited to, the evaluation of athletes. To avoid the aforementioned problem of disparate evaluations by evaluators with varying degrees of evaluation acumen, including poor acumen or rating biases, the invention incorporates a novel approach to rate each evaluator, and accordingly provides a weighted personnel evaluation from each evaluator.

As an example, all crowdsourcing members (i.e., evaluators) are themselves evaluated against a crowd-sourced rating, which is in effect a totality of the crowd-source ratings from all crowd-sourcing participants over a predetermined time. Evaluator ratings that are consistently equal to or agree closely with the totality of the crowd-sourced ratings are rated higher by assigning a higher weight to their rating. The weight may be determined, for example, by a difference between an evaluator's rating and a crowd-source rating. Those evaluators whose evaluations consistently deviate from the totality of the crowd-sourced ratings are rated lower, that is, assigned a lower weight.

The weight for each evaluator is mathematically and iteratively determined based on how close or far the evaluator's rating is from the crowd-sourced rating. Such a process is readily repeated, resulting in greater accuracy with each iteration.

Taking an example of a single player to be evaluated, the process begins by assigning all evaluators the same weight value, and then calculating an overall rating for the player using all evaluations of that player. Here "overall" does not necessarily refer to all abilities of the player within a particular field of endeavor, but rather refers to a compilation or combination of all evaluations of that player. Since many evaluators are involved in the process, the overall player rating can also be referred to as a crowd-sourced overall player rating.

The weight value for each evaluator is then updated (iteratively) using the player's overall rating as a parameter in certain equations defined below. Using the updated weight value for each evaluator, an overall rating for the player is again determined. And using the player's overall ratings, the weight value for each evaluator is again updated. This iterative process continues, resulting in increased accuracy with each iteration.

The inventors have determined that after a relatively small number of iterations (six or seven in one embodiment), the weight value for each evaluator converges to a final weight value. This final weight value accurately represents the weight that should be applied to ratings supplied by that evaluator. All evaluations, as contributed by all evaluators, with each evaluator assigned a weight value to be applied to all his/her evaluations, are combined to generate a more accurate (as compared with the use of raw evaluations with no assigned weights) crowd-sourced overall player rating.

The concepts of the invention can be applied to any number of evaluators and any number of players.

In simple terms, the weighted-average approach allows the more "accurate" evaluators (spectators or fans, for example) among the crowdsourcing participants to have a greater influence, and likewise reduces the influence of less accurate or biased crowdsourcing participants, in the final crowd-sourced overall player rating.

Because the weight assigned to each evaluator's rating is updated with each iteration, the accuracy of the overall or totality of the personnel evaluation ratings increases, as compared to any rating by an individual within the crowd-source or as compared to a simple (i.e., unweighted) crowd-sourced arithmetic mean (i.e. an unweighted average).

The current invention also encompasses a social media aspect, as fans in the stands comprise a social network or social fabric, often with the same fans repeatedly attending events or games together. As the crowdsourcing participants participate in the personnel evaluation process (and themselves are rated according to the concepts of the present invention) it is expected that camaraderie, fellowship, and friendly competition will ensue, reinforcing participation of the evaluators and their commitment to accuracy, thereby further ensuring success of the current concepts and invention.

DETAILED DESCRIPTION

Detailed embodiments are disclosed herein, including specific examples; however, it is to be understood that the disclosed embodiments of the current invention are simply representative examples and representative processes, and that the system and methods described herein can be embodied in various forms. As such, the specific details, functions and processes disclosed herein are not to be considered or interpreted as limiting, but are intended as the basis and foundation for the current claims and as a representative basis for teaching one skilled in the art to employ the present subject matter in various detailed processes and methods. Furthermore, the specific terms and phrases used herein are not intended to be limited with regard to the current invention or claims, but rather, are intended to provide an understanding of and description of the concepts.

The current invention provides a practical solution to a problem inherent with using crowd-sourcing techniques to evaluate or rate a person's performance in a specific field (sports, for example). One aspect of this problem are the inevitable variations among the ratings of a single person (an athlete, for example) as provided by several evaluators. Additionally, certain ones of the evaluators may have a better understanding and familiarity with the field than others, again creating a distorted evaluation.

To resolve this difficulty, the crowd-sourced information is analyzed using a novel technique of evaluating the performance of the individual crowd-sourcers (i.e. evaluators) who contribute to the crowd-source information. According to the invention, a numerical weight value is applied to each evaluation, thereby creating a weighted-average crowd-sourcing paradigm. The weight value is determined by comparing each evaluator's evaluation or rating with a compilation of all the crowdsourced evaluation ratings.

The approach is iterative by nature, and accordingly, the accuracy and fidelity of the weighted-average crowdsourcing approach improves with the number of iterations. Furthermore, the use of the weighted-average methodology mitigates the effect of poor (i.e., inaccurate) or biased evaluators among the individual crowdsourcing participants, while leveraging those with high acumen for quality personnel evaluation in the field.

For the purpose of this description herein, the term "Player" is defined as a person being evaluated by the crowdsourcing process; hence a Player may be an athlete or any other personnel category, such as a musician or aspiring actor or model. The term "Scout" is defined as a person performing the evaluation; hence a Scout is a person in the crowdsourcing "Crowd" such as a fan in the stands or any other evaluating person (evaluator) participating in the crowdsourcing process. The term "Recruiter" is defined as a person, agency or other entity that is the recipient of the crowd-sourced information; hence a recipient of the personnel evaluations.

Figure 1:
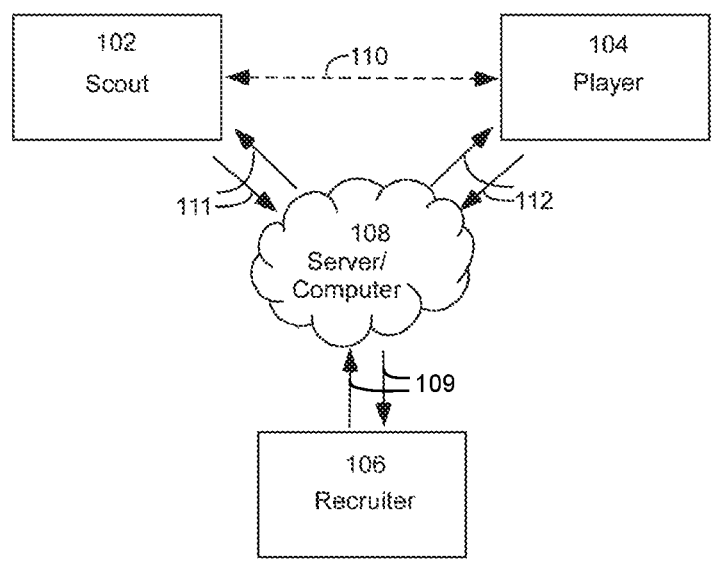
FIG. 1 illustrates the primary concept of a crowdsourcing approach to personnel evaluation, in which "Scouts" evaluate "Players".

FIG. 1 illustrates the basic concept of a crowdsourcing approach to personnel evaluation (as embodied in the present invention), in which "Scouts" 102 evaluate "Players" 104, and a central Server/Computer 108 both compiles, calculates, and manages Player ratings and Scout ratings, while also providing Player ratings and other player information to Recruiters 106 via a path 109. As shown by a connecting line 110 individual Scouts evaluate individual Players, and have access to other relevant Player information, such as metrics or statistics. As suggested by two sets of arrowheads 111 and 112, both Players 104 and Scouts 102 may upload data to and download data from the Server/Computer 108. For example, players may upload additional performance metrics to the Server/Computer, for Scouts to access and use.

The embodiment of the crowdsourcing method and system as described herein is managed/executed by the Server/Computer 108 of FIG. 1, which is implemented by one or more data processing devices, such as a central server or servers, or a central computer or computers, including for example cloud-based servers, in which said servers/computers compile and store all related data, perform relevant calculations, and provide means for user interfaces between all participants, including but not limited to Players, Scouts, and Recruiters, as well as data managers, etc. In one embodiment, the Server/Computer 108 also provides an interface for evaluators to enter the rating for processing. The approach of the invention may also be web-based and may run on a broad array of operating systems and platforms, including but not limited to mobile devices (e.g. iOS or Android based-devices), cell phones, smart phones, tablet devices, laptop devices, PC devices, and wearable electronic devices.

As defined above, three primary categories of participants are identified, namely, Players, Scouts, and Recruiters; however, various embodiments are not limited to these three categories. In general, according to one embodiment, Players enroll, or in other words, "sign-up" for the personnel evaluation service with the intent of being evaluated and recruited. For example, a high school athlete might enroll as a participant with a goal of being evaluated and subsequently recruited by a university or college, in other words by a Recruiter, to play his or her chosen sport at the collegiate level. A musician might enroll as a participant with a goal of being signed by a record label. Such examples are not considered limiting.

Upon enrollment, a Player may also upload personal information and performance statistics or metrics (e.g., to the Server/Computer 108 as indicated by the arrowheads 112). For the example of the high school athlete, such information might include the associated high school, sport or sports played, the position(s) played and uniform number, personal statistics such as height, weight, or speed, and performance statistics related to each sport played, such as pass completion percentage for a high school football quarterback, or batting average for a high school baseball or softball player, or points per game for a high school basketball player, and so on. Other digital media or information may also be uploaded by a Player, including photographs or videos, including video of the athlete participating in his or her chosen sport or sports, or songs and performances for the example of the musician. Additional traits that speak to the Player's character may be uploaded, including scholastic data or other accolades, such as GPA, academic awards, and community service awards.

All such information uploaded for a Player becomes linked exclusively with said Player, and in aggregate forms that Player's online portfolio, which is stored, compiled and managed by the Server/Computer 108 of FIG. 1.

In general, Scouts (i.e., evaluators) enroll, or in other words, sign-up for a personnel evaluation service with the intent of providing evaluations in the context of the crowdsourcing process and method. For example, a high school sports fan might enroll as a participant with a goal of evaluating players, and subsequently helping players to be recruited by a university or college, in other words by a Recruiter, to play his or her chosen sport at the collegiate level. Such an example is not considered limiting of the scope of the present invention.

Upon enrollment, a Scout may also upload her/his personal information. For the example of the high school sports, such information might include the associated high school stadium or venues he/she most frequents, sport or sports of most interest, and other information including personal contract information. Other digital media or information may be uploaded by a Scout, including photographs or videos. All such information uploaded for a Scout becomes linked exclusively with said Scout, and forms that Scout's online portfolio, and is stored, compiled and managed by the system's server or servers, such as the Server/Computer 108 of FIG. 1.

In general, Recruiters enroll, or in other words, sign-up for the personnel evaluation service with the intent of reviewing and requesting evaluations in the context of the crowdsourcing systems, processes, and methods of the present invention. For example, a college coach, college recruiter, professional college scout, or college athletic director might enroll as a Recruiter with a goal of receiving Player evaluations, and subsequently recruiting players to a university or college, to play his or her chosen sport at the collegiate level. Such an example is not considered limiting. Upon enrollment, a Recruiter may have access to Player ratings and Player information, as described herein. Recruiters will also have the ability to perform search functions, for example, searching for Players by sport, position, geographic location, high school, by performance metrics or personal metrics, and by the crowd-sourced rating factors, to name a few.

Recruiters can also create wish lists, watch lists, directly contact Players, perform Player-to-Player comparisons, track players, request ratings of specific Players, and generally use all available Player information in the evaluation or recruitment of Players. Generally, these functions are executed and/or controlled by the Server/Computer 108 of FIG. 1.

Players, Scouts, and Recruiters may have identifiers for log-in and security reasons, which may include user names, passwords, recovery emails addresses, and other steps and practices commonly used for on-line social networks and enterprises to ensure data integrity and security.

Figure 2:
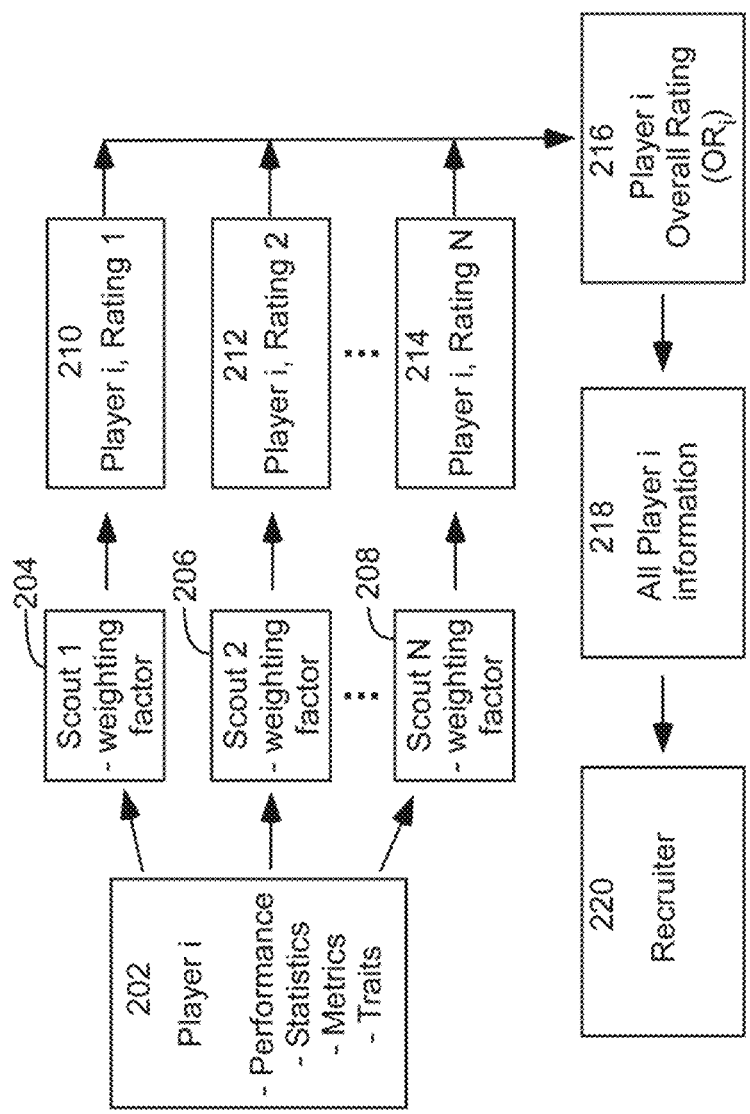
FIG. 2 illustrates the process flow for calculating an Overall Player Rating, in which each of N Scouts provide a personnel evaluation (i.e., a Player Rating) of the ith Player.

One novel aspect of the current invention is the use of a crowd-sourced based weighted average to evaluate personnel, as illustrated with the Player and Scout model described above and further defined, but not limited to, the process flow diagram of FIG. 2. Here an individual Player 202, designated as the ith Player (Player i), is rated by N different Scouts, where N is greater or equal to 2. The N Scouts represent crowdsourcing evaluators.

Accordingly, a unique weighting factor (sometimes simply referred to as a weight) is determined for each one of a Scout 1 204, a Scout 2 206, through an Nth Scout 208. As described herein, each Scout's weighting factor is determined based on an iterative feedback approach.

Each one of the N Scouts provides a rating of Player i, as depicted by a Rating 1 of Player i as provided by Scout 1 (reference numeral 210), a Rating 2 of Player i as provided by Scout 2 (reference numeral 212), to a Rating N of Player i as provided by Scout N (reference numeral 214).

The N Player ratings and the corresponding N Scout weighting factors (a technique for determining the weighting factors is described herein) are used to compile, as elaborated on further below with respect to FIG. 3, an Overall Rating of Player i (reference numeral 216). Player i (reference numeral 202) also has associated Player information, such as performance metrics, statistics, traits, or other digital information or media useful for the overall assessment and personnel evaluation of Player i. All such information 218, including the Overall Rating 216, may be provided to a Recruiter 220 (or Recruiters), as well to the Scouts 1 to N (this feature not illustrated in FIG. 2).

Figure 3:
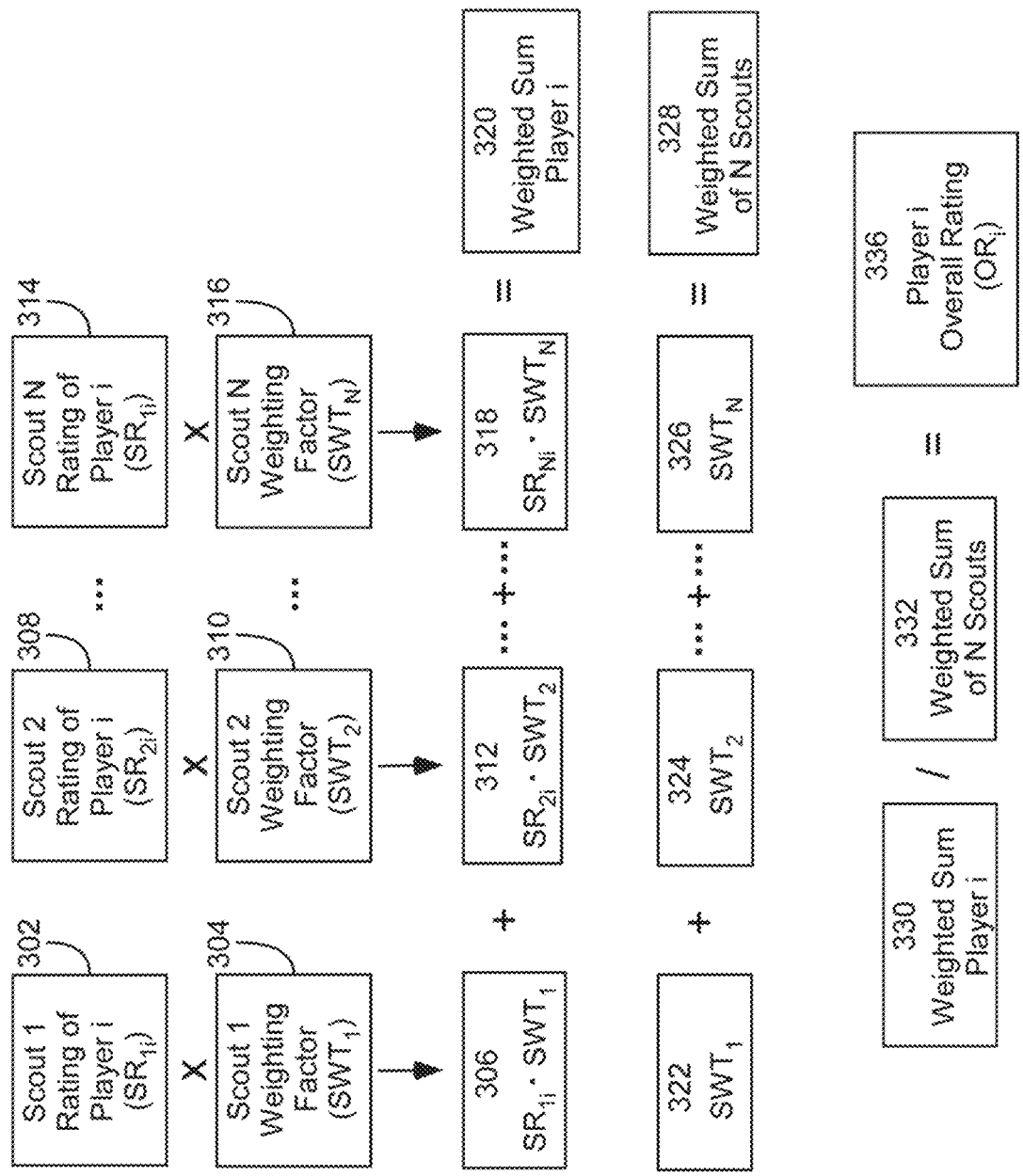
FIG. 3 illustrates an algorithm for calculating an Overall Player Rating, in which each of N Scouts provides a Player Rating. The final step provides a weighted average of the N individual Scout (i.e. Evaluator) ratings of the ith Player.

FIG. 3 provides a more detailed schematic of an algorithm to calculate the Overall Rating of Player i ($OR_i$) as evaluated by N individual evaluators (i.e., Scouts), where N is greater than or equal to 2. The individual Scouts represent a crowd with respect to the crowdsourcing method of the invention.

Accordingly, Scout 1 provides a Scout Rating of Player i ($SR_{1i}$) 302, which is then multiplied by the Scout Weighting Factor ($SWT_1$) of Scout 1 at a step 304 and stored at a step 306. In the double subscript notation of $SR_{nm}$, the first digit represents the nth Scout (the evaluator) and the second digit represents the mth Player (the evaluee).

Similarly, Scout 2 provides a Scout Rating of Player i ($SR_{2i}$) at a step 308, which is multiplied the Scout Weighting Factor ($SWT_2$) of Scout 2 at a step 310 and stored at a step 312. The process is repeated for all Scouts until Scout N provides a Scout Rating of Player i ($SR_{Ni}$) at a step 314, which is then multiplied the Scout Weighting Factor ($SWT_N$) of Scout N at a step 316 and stored at a step 318.

Subsequently, all products of the Scout Rating and the corresponding Scout Weighting Factor, 1 to N, are summed to yield the Weighted Sum for Player i at a step 320.

The individual Scout Weighting Factors are then summed as also indicated in FIG. 3. Hence the Scout Weighting Factor of Scout 1 ($SWT_1$) at a step 322 is added to the Scout Weighting Factor of Scout 2 ($SWT_2$) at a step 322 and so on to a step 326 where the addition of the Scout Weighting Factor of Scout N ($SWT_N$) is added, yielding the Weighted Sum of N Scouts at a step 328.

The Weighted Sum 328 of N Scouts is used to normalize the Weighted Sum 320 of Player i; therefore, the Overall Rating ($OR_i$) 336 of Player i is defined by the Weighted Sum of Player i as divided by the Weighted Sum 332 of N Scouts. By normalizing the weighted sum of a Player, the effects of Scouts with different weights are accounted for while maintaining an Overall Rating within the weighting scale. Thus, the weighted sum of a first player who has been rated by Scouts A and B, can be equitably compared with the weighted sum of a second player who has been rated by Scouts C and D, albeit Scouts A, B, C, and D have been assigned different weights.

This operation is defined by Equation (1) below.

$$OR_i = \frac{\sum_{j=1}^{N} SR_{ji} * SWT_j}{\sum_{j=1}^{N} SWT_j} \tag{1}$$

The use of Equation (1), as depicted by the steps and arithmetic operations depicted in FIG. 3, embodies the concept of using a weighted evaluation to calculate a weighted average, in that the evaluations of all N Scouts (i.e., evaluators) are not counted equally, but instead are weighted.

Additional details of the weighting factor are provided below, but weighting factors can range over any suitable scale. For example, a 1 to 100 scale, a 0 to 1 scale, and a −1 to 1 scale, are all valid approaches for weighting factors and are not considered limiting features of the present invention.

For example, the normalization by the denominator of Equation (1), namely the Weighted Sum 328 of N Scouts of FIG. 3, allows the use of any weighting factor scale, so long as the same weighting factor scale is applied to the rating by each Scout.

It is noted that the current invention reduces to a simple arithmetic mean (i.e. simple average) if the Weighting Factor of each Scout ($SWT_j$) is set to unity (or another constant value) for all Scouts j=1 to N, as shown by Equation (2) here.

$$UOR_i = \frac{\sum_{j=1}^{N} SR_{ji}}{N} \qquad (2)$$

where $UOR_i$ is the Unweighted Overall Rating of the Player i. However, as can be appreciated, if the weight value associated with each Scout evaluation is the same (which in effect means there is no weight value), then the rating of one Scout's evaluation is not considered more important or less important than the evaluation rating of other Scouts.

Comparison of Equation (1) and Equation (2) reveals a substantial difference between the embodiment utilizing the weighted evaluator average to produce an Overall Rating ($OR_i$) and a simple unweighted evaluator average to produce an Unweighted Overall Rating ($UOR_i$) of the Player i, that is, the use of the Scout Weighting Factors. Clearly Equation (1) provides a more accurate evaluation of the Player, and progressively becomes more accurate with each iteration, as detailed below in one embodiment.

The concepts described herein to yield a crowd-sourced Overall Rating ($OR_i$) of any Player i can also be used to calculate any number of specific performance metrics for Player i using an identical process. The Overall Rating is considered the summary rating, encompassing the overall or aggregate assessment of a given Player. However, the evaluation of Player i is not limited to a single metric and a single overall rating. Accordingly, Player i could be evaluated using the same weighted-averaging approach for any number of attributes or performance metrics as evaluated by the crowd of crowd-sourcers.

Generally, the OR overall rating described herein encompasses many elements of the Players attributes, e.g., speed, quickness, agility. Thus, the Scout's rating represents a composite rating for the Player.

Using the athlete example, in lieu of using an Overall Rating for the athlete (i.e., one that combines many different aspects or attributes of the athlete's abilities) the evaluators may in addition rate and therefore input unique or individual ratings for individual Player attributes, such as speed, quickness, strength, leadership, performance metrics (e.g., passing acumen, rushing acumen, scoring acumen, batting acumen, etc.). The algorithm of FIG. 3 can be used for each unique or individual rating and thus a weighted overall average rating ($OR_{is}$) for each unique or individual performance metric can be determined, with the additional subscript "s" denoting a specialty rating; such additional ratings may be considered specialty ratings, or auxiliary ratings or attribute ratings.

The rating of any specific metric must entail a rating scale, and there exists a plurality of rating scales such as an integer scale from 1 to P, (such as 1 to 5; or 1 to 10), or a Likert scale such as ranging from Strongly Dislike to Strongly Like. Scales may also be "continuous" in nature, such as a sliding bar on a mobile app device from 1 to 10; however, any "continuous" scale will be digitized to a discrete resolution value to complete the analysis; therefore, while a continuous sliding scale may be utilized for any rating scale as entered by the evaluators (Scouts), for practical consideration, all scales are considered as having a discrete increment over some finite range.

Figure 4:
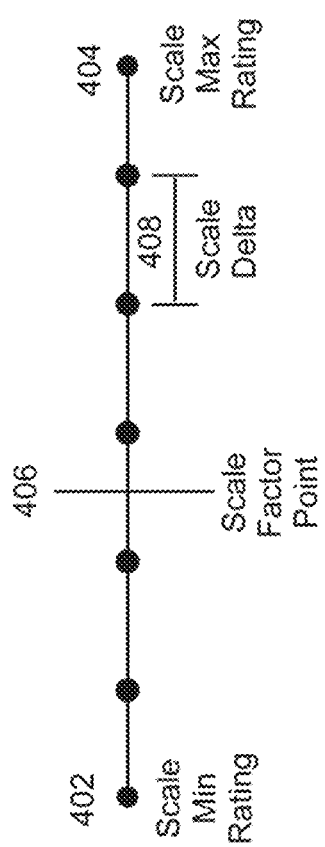
FIG. 4 illustrates the overall sample rating Scale, depicted with a Minimum and Maximum scale rating, a scale Delta (i.e., an increment), and a Scale Factor Point.

FIG. 4 illustrates for purposes of defining the Scout Weighting Factors, a proposed Rating Scale, as defined by a Scale Minimum Rating 402 and a Scale Maximum Rating 404, along with a Scale Delta 408 (i.e., a scale increment). For example, a five-point integer rating scale of 1, 2, 3, 4, 5 would have a Scale Minimum Rating of 1, a Scale Maximum Rating of 5, and a Scale Delta of 1. Similarly, a 7-point integer rating scale of 1, 2, 3, 4, 5, 6, 7 would have a Scale Minimum Rating of 1, a Scale Maximum Rating of 7, and a Scale Delta of 1. Such examples and scales are not considered limiting.

FIG. 4 also depicts a Scale Factor Point 406, which is defined as a value greater than the Scale Minimum Rating and less than the Scale Maximum Rating, but the Scale Factor Point may not be limited to discrete integer values.

Using the above example of the five-point integer scale, the Scale Factor Point could be any value greater than 1 and less than 5, such as 2.5, or 3, or 3.5, etc. As detailed below, the Scale Factor Point is used to define the Scout Weighting Factors, that is, the weighting factors used to weight the individual evaluator's ratings.

In one embodiment, a logarithmic scale is used to calculate the Scout Weighting Factors (SWT) for any given Scout, although such an approach is not limiting of the scope of the present invention.

To calculate the Scout Weighting Factor for an individual Scout j, the personnel evaluations of Scout j are compared to the personnel evaluations of the entire crowd (crowd-sourced) of evaluators. In other words, every Player i who was rated by Scout j is used to evaluate the performance of Scout j. Letting M be the number of Players rated by Scout j, Equation (3) is given as $$SDR_j = \frac{\sum_{i=1}^{M} \text{Abs}(SR_{ji} - OR_i)}{M} \qquad (3)$$

where the parameter $SDR_j$ is defined as the Scout Differential Rating of an individual Scout j. As can be seen from equation (3) above, it is calculated as the sum of all absolute values of the difference between the Scout Rating of Player i by Scout j ($SR_{ji}$) and the Overall Rating of Player i ($OR_i$) by all Scouts who evaluated Player i. That value is divided by M Players as rated by Scout j (which normalizes the equation by M). Note that $OR_i$ is defined above, and is based on the crowd-sourced average rating of the ith Player per Equation (1) above.

For example, if Scout j has rated 10 unique Players (M=10), $SDR_j$ is calculated by taking the absolute value of Scout j's rating of Player 1 minus Player 1's Overall Rating, namely $\text{ABS}(SR_{j1}-OR_1)$, added to the absolute value of Scout j's rating of Player 2 minus Player 2's Overall Rating, namely $\text{ABS}(SR_{j2}-OR_2)$, and so on until finally adding the absolute value of Scout j's rating of Player M minus Player M's Overall Rating, namely $\text{ABS}(SR_{jM}-OR_M)$. The resulting sum is then divided by M.

A few observations regarding Equation (3) are noted here, but not considered limiting to the follow-on calculation of the Scout Weighting Factor, which directly follows from the SDR. If Scout j is defined as a "Perfect Scout", meaning that Scout j's rating of each and every Player as rated by Scout j is identically equal to the crowd-sourced Overall Rating of each and every Player, then the Scout Differential Rating of Scout j would be identically equal to zero. Accordingly, the lower limit of the Scout Differential Rating of any given individual Scout is zero.

On the other end of the spectrum, the maximum theoretical value of the Scout Differential Rating approaches the value of the range of the corresponding Rating Scale; hence of the difference between the Scale Maximum Rating 404 and the Scale Minimum Rating 402, with reference to FIG. 4. Such a maximum theoretical value (Maximum Rating minus Minimum Rating 402) would be approached by Scout j only if every Player evaluated by the crowd received a near-unanimous rating of either the Scale Minimum or the Scale Maximum, and for each case, the Scout j rated the respective Player at the opposite end of the Scale of FIG. 4. Such a scenario is highly unlikely but does illustrate the upper limit approached by the Scout Differential Rating.

A more practical benchmark for comparing an individual Scout j's performance to a measure of "worst case" performance uses a Scale Factor Point 406 as illustrated in FIG. 4. Letting the Scale Factor Point be somewhere near the center of the Scale Range, for example, defining the Scale Factor Point as equal to one-half of the Scale Maximum Rating, provides a reasonable starting point, although as noted above, the Scale Factor Point may be set anywhere between the Minimum Scale Rating and the Maximum Scale Rating. If for example, the Rating Scale depicted in FIG. 4 is a seven-point integer scale, with Scale Minimum Rating 402 set to 1 and the Scale Maximum Rating 404 set to 7, the Scale Factor Point 406 as approximately illustrated is equal to 3.5.

While the examples above are not limiting, the Scale Factor Point represents a value reflective of the upper "practical" bound of the Scout Differential Rating SDR as defined by Equation (3), notably when the Scale Factor Point is set equal to or approximately equal to one-half of the Scale Maximum Rating.

Supporting logic suggests that most personnel populations being rated will follow some distribution across the Rating Scale, with some corresponding arithmetic mean and standard deviation. For example, the population of ratings may be given by a normal (i.e., Gaussian) distribution, or a log-normal distribution, with the mean value is expected to fall within the Scale Range, even near the center of the Scale Range.

Accordingly, for the example of a seven-point scale, the mean Overall Rating of many numbers of individual Players may fall in the range of 3 or 4 or 5. Therefore, even a "poor" Scout who is consistently rating Players at the extremes of the Rating Scale (i.e., giving 1's or 7's ratings for an exemplary seven-point scale) would be expected to yield a Scout Differential Rating in the range of 3 or 4. As such, a Scale Factor Point of roughly one-half of the Scale Maximum Rating becomes a reasonable estimate of the practical upper limit of the Scout Differential Rating. Such an estimate is not limiting in any way to the algorithms presented here, but only illustrates the concept of calculating the Scout Weighting Factor from the Scout Differential Rating as calculated from Equation (3).

Using the aforementioned Scout Differential Rating ($SDR_j$) (from Equation (3)) for a given Scout j, and the Scale Factor Point (SFP), the Scout Log Weighting Factor for Scout j ($SLWT_j$) is defined by Equation (4):

$$SLWT_j = 2 \cdot [1 - (SDR_j/SFP)] \quad (4)$$

as illustrated for a logarithmic scale of two decades as denoted by the pre-multiplier of 2 as the first term in Equation (4). For example, if a three-decade logarithmic scale is used, the 2 is replaced by a three, and so on, although such examples are not considered limiting. As observed in Equation (4), if the "perfect" Scout j had a corresponding $SDR_j$ equal to zero, as described above, the term inside of the bracket is reduced to 1, and the resulting SLWT is calculated as 2, which is the maximum weight value for the example of the two-decade logarithmic scale.

On the other hand, for the example of a "poor" Scout j, there would be a corresponding value of $SDR_j$ in the approximate value range of the Scale Factor Point SFP, if the SFP is selected as discussed above. Accordingly, the inner parenthetical term will be equal to unity or near unity, and therefore the bracket term will equal to or be approximately near zero. For such a case, the resulting value of SLWT would be near zero, corresponding to the lower weight value (i.e. minimum value) for the example of the two-decade logarithmic scale.

The example defined by Equation (4) is not limiting in any way, as various logarithmic scales could be utilized, but the general result is the $SLWT_j$ value of Scout j will tend to zero (i.e. the lower end of the scale) for "poor" Scouts, and will tend to the upper value, given by 2 for this example (i.e. the upper end of the scale) for "accurate" Scouts. Additionally, the logarithmic scout rating factor can be converted to a linear-scale scout rating factor by using Equation (5) as will be described below.

For some scenarios, the SLWT value may be used directly as the Scout Weighting Factor (see FIG. 3 for example), for which case $SLWT_j$ would be set equal to $SWT_j$. Such a scenario defines only one embodiment and is not considered limiting of the scope of the invention.

Figure 5:
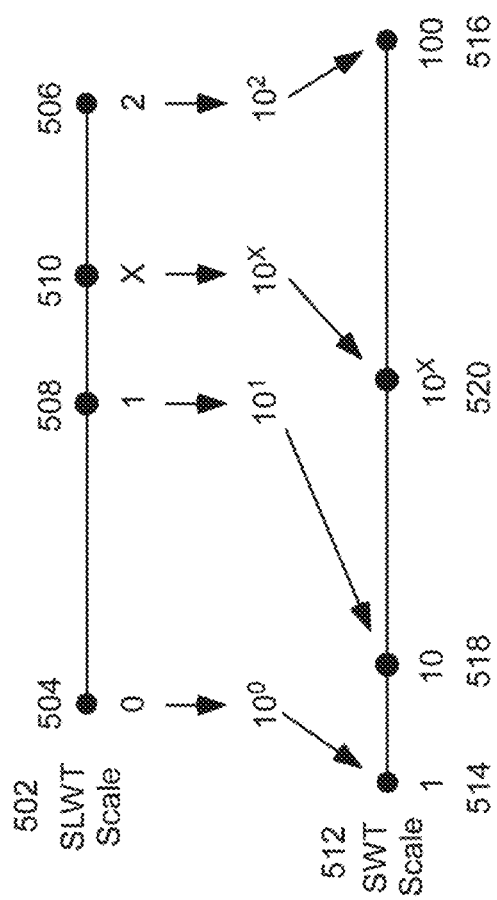
FIG. 5 illustrates the sample mapping between a logarithmic value of a Scout Weighting Factor (SLWT) and a corresponding linear value of a Scout Weighting Factor (SWT), for a two-decade logarithmic scale example.

For other scenarios, it is desirable to map the Scout Log Weighting Factor SLWT to a linear map, for example, by using Equation (5)

$$SWT_j = 10^{SLWT_j} \quad (5)$$

where the Scout Weighting Factor of Scout j, that is $SWT_j$, is calculated by raising the log-base 10 to the power of the Scout Log Weighting Factor $SLWT_j$, as defined for example by Equation (4). As illustrated in FIG. 5 for a two-decade log scale, Equation (5) serves to map the logarithmic scale to a final linear scale, in this case a linear scale from 1 to 100. For example, the SLWT scale 502 having a value of zero at a point 504 maps to 10 raised to the zero power, which produces a SWT value of 1 at a point 514.

On the other end of the scale, a SLWT at a point 506 with a value of 2 maps to 10 raised to the second power, which produces a SWT value of 100 at a point 516. In this way, the two-decade logarithmic scale of 0 to 2 is mapped to a linear scale of 1 to 100.

For intermediate values, a SLWT having a value of 1 at a point 508 maps to 10 raised to the first power, which produces a SWT value of 10 at a point 518. A generic SLWT value given by x at a point 510 maps to a value of 10 raised to the power of x at a point 520 on the linear scale. The above examples are not considered limiting, but in general, perfect Scouts are transformed to the higher range of the SWT scale, while poor (i.e. inaccurate) Scouts are transformed to the lower range of the SWT scale.

An additional advantage of the embodiment discussed above is that even negative values of the SLWT map to positive SWT values, maintaining positive weighting factors for all Scouts. For example, if the Scout Differential Rating for Player j ($SDR_j$) is slightly larger than a defined value of Scale Factor Point SFP, then as given by Equation (4), the quotient of $SDR_j$ as divided by SFP is greater than one, and the difference within the bracket of Equation (4) is negative, and thus the value of SLWT for Player j will be a negative number, although a generally small (i.e. near zero) negative number.

Under this scenario, the final Scout Weighting Factor, as given by Equation (5), is calculated as 10 raised to the negative number of SLWT, resulting in a number bounded by zero and 1. Accordingly, the overall linear range of Scout Weighting Factors is practically extended slightly, to range from zero to the maximum value. The practical outcomes are two-fold, as such logarithmic-to-linear mapping generates a positive overall Scout Weighting Factor range, and confines extremely poor Scouts (i.e. those with poor personnel evaluating acumen or a strong rating bias) to the extreme low end of the Scout Weighting Factor scale (i.e. between 0 and 1), thereby minimizing their influence on the crowd-sourced evaluation (i.e. rating) and improving the accuracy of the current invention.

The above treatment of the calculation of Scout Weighting Factors shows typical embodiments that leverage the logarithmic scale to help spread the Scout Weighting Factors over the positive, linear scale, but are not considered as limiting of the scope of the present invention. Any number of scales, such as logarithmic, linear, power, exponential, etc., may be used as readily apparent to anyone skilled in basic algebra and mathematics.

Furthermore, the use of Equation (3) to calculate a Scout Differential Rating is not considered limiting, as many other approaches are available for assessing the agreement between sets of numbers, as in the agreement between individual Scout Ratings and the Overall Ratings of the crowd-sourced data. Common approaches might involve the use of a root mean square error (RMS), a standard error, or any other statistical method of assessing a quantifiable measure of agreement. Furthermore, more sophisticated methods of weighting the personnel evaluators as compared to the crowdsourcing response are available, such as neural networks, principle components analysis, partial least squares, and least squares approaches, as such techniques are readily apparent to those skilled in art of data analysis and quantification of error.

Recall that one objective of the present invention is determining a weighting factor to be applied to the player rating made by each evaluator. The weight value assigns a relative worth to each rating that is contributed to generate the crowd-sourced rating.

To calculate the Overall Rating (OR) from Equation (1), each scout submits a Scout Rating (SR) and each scout is assigned an identical initial Scout Weighting Factor (SWT) Value. The Overall Rating for a Player i can be calculated from Equation (1).

Equation (3) is then used to calculate the Scout Differential Rating followed by Equation (4) to calculate the Scout Log Weighting Factor (SLWT) or the Scout Weighting Factor (SWT) using Equation (5).

Since Equation (1) is normalized by the denominator, either the SLWT or the SWT (or a different weighting factor) can be used in Equation (1).

Equation (1) is now executed again with the updated value for the scout weight as determined from Equation (4) or (5) to generate a new overall player rating.

Equations (3) and (4) (and (5) if required) are executed again using the updated overall rating to again generate an update scout rating weight.

The process continues as described through a finite number of iterations until the rating weight for each scout (the weight for each scout being the ultimate objective of this effort) converges to a final value (i.e., one that does not change significantly with additional iterations).

These converged weight values are now used in Equation (1) to determine the overall rating of a player, that is, a crowd-sourced overall rating, but with each rating value weighted in the crowd-sourced rating calculation. The result, by employing the present invention is a more accurate crowd-sourced overall rating.

As described, the Equations and resulting numerical values can be applied to any number of players (i) and any number of scouts (j).

Figure 6:
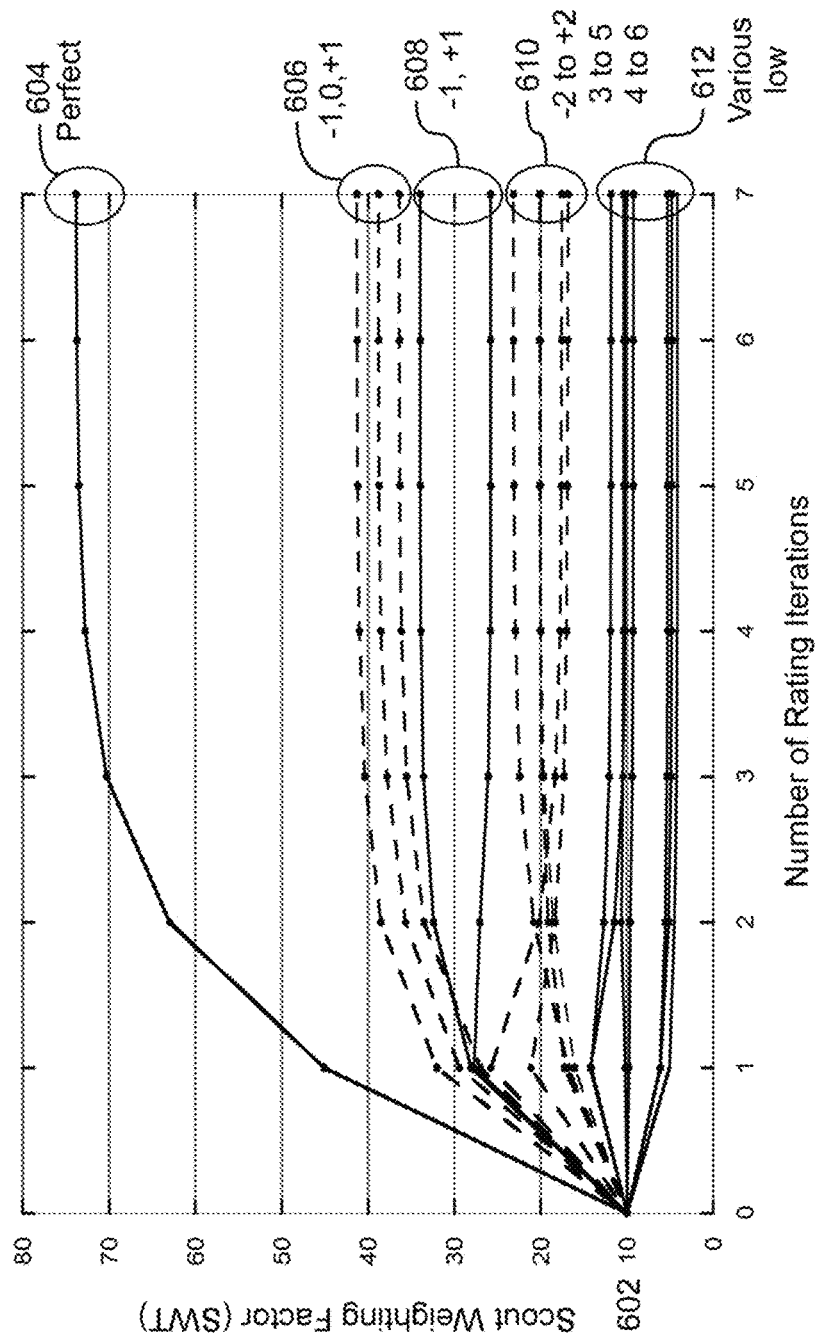
FIG. 6 illustrates one example of the evolution of Scout Weighting Factors (SWT) over seven iterations for a simulated population of twenty Scouts and twenty Players.
Figure 7:
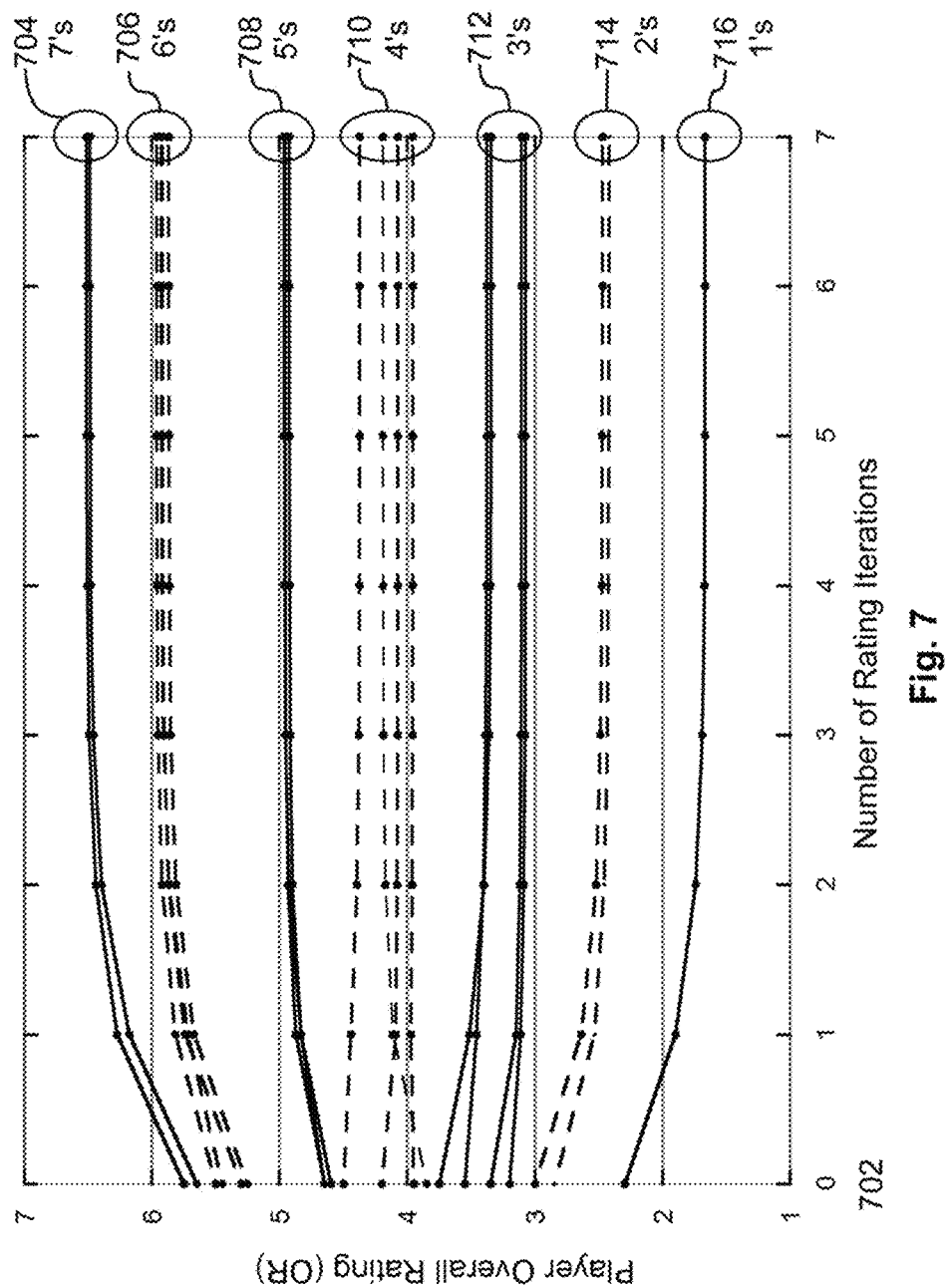
FIG. 7 illustrates one example of the evolution of Overall Player Ratings (OR) over six iterations for a simulated population of twenty Players as rated by twenty Scouts.
Figure 8:
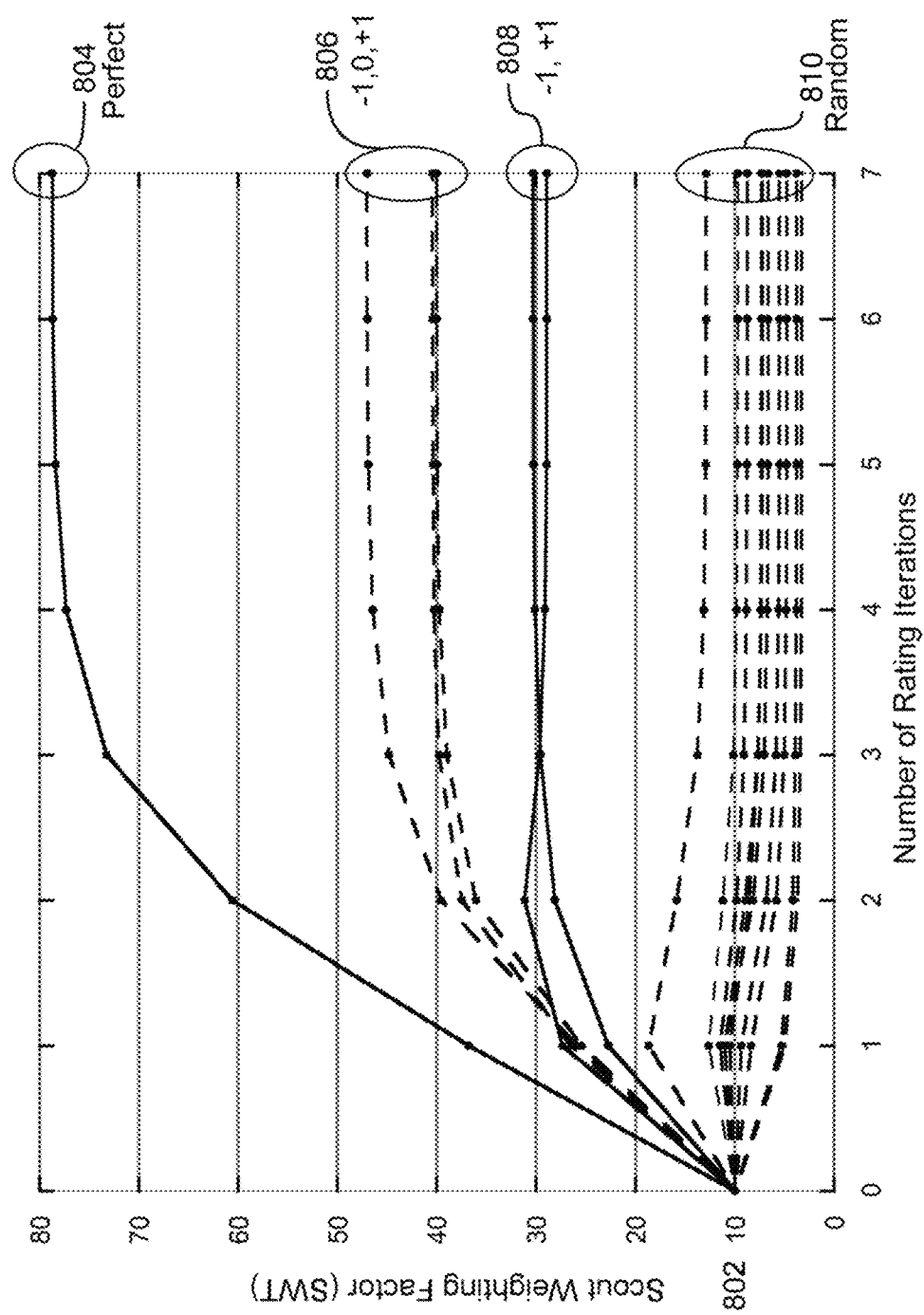
FIG. 8 illustrates one example of the evolution of Scout Weighting Factors (SWT) over seven iterations for a simulated population of twenty Scouts and twenty Players.
Figure 9:
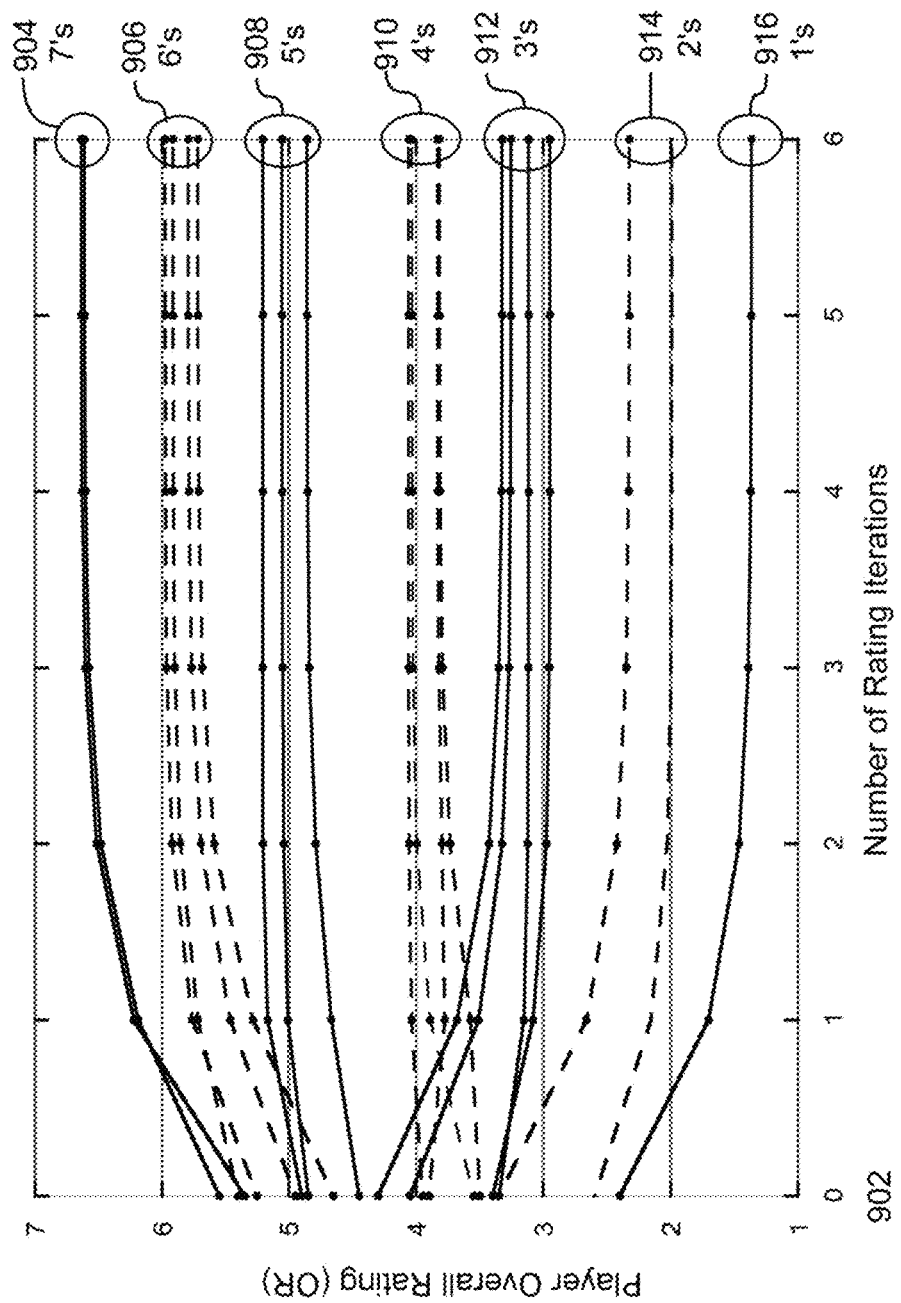
FIG. 9 illustrates one example of the evolution of Overall Player Ratings (OR) over six iterations for a simulated population of twenty Players as rated by twenty Scouts.

The results of the iterative process are shown in FIGS. 6 and 8 with respect to updating the scout weighting values for a plurality of scouts. And the process of iterating with respect to the overall ratings for a player is illustrated in FIGS. 7 and 9. These Figures are described further below.

Turning now to FIGS. 6 and 7, they illustrate one exemplary application of the current invention using a 7-point rating scale (i.e., 1 to 7) in combination with a two-decade logarithmic scale for evaluating the Scouts (i.e., for evaluating each scout as to the accuracy of his/her ratings as compared to the crowd-source rating).

For this example, an array of 20 Scouts and 20 Players has been created, with Players randomly assigned Overall Ratings (i.e., personnel evaluations) on the scale of 1 to 7, using only integer values. These randomly assigned ratings may be considered the "true" Rating of each Player, (i.e., the rating that represents the Player's true or actual abilities in this simulation).

The 20 Scouts are then assigned various levels of evaluating acumen (i.e., talent scouting acumen), for example, three Scouts are defined as "perfect" Scouts, in that they rate each of the 20 Players perfectly. In other words, their rating is set to match the "true" Rating of each Player.

Three Scouts are defined to randomly assess a rating within a range of +1 and −1 of the "true" rating. For example, if the true rating was 4, each of these three Scouts would rate the Player as either 3, 4 or 5, with the specific rating value assigned by each Scout determined randomly.

Two Scouts among the 20 Scouts are defined as either always 1 higher than the true Rating or always 1 lower than the true Rating. Hence if a Player had a true Rating of 5, one of these Scouts would rate the Player a 4, and one would rate the Player a 6.

Five Scouts are assigned to randomly rate the Player between +2 and −2 of the true rating, or each Scout is randomly assigned a fixed rating between 3 and 5 or between 4 and 6, which reflects an evaluators tendency to put all players in the same mid-scale bracket.

Five Scouts are designated as always giving a rating that is 2 to 3 ratings below the true Rating, or giving a rating between 2 and 4 or between 5 and 7, or giving either all ratings of 2 or all ratings of 6.

Finally, two Scouts are designated to provide a totally random rating between 1 and 7.

To begin, each Scout is assigned a Scout Log Weighting Factor of 1, which corresponds to a linear-scale Scout Weighting Factor of 10.

FIG. 6 illustrates the evolution of the Scout Weighting Factors (SWT) over 7 iterations of evaluating the Scout performance, with all 20 Scouts beginning with a SWT of 10, as indicated by a reference numeral 602, at zero iterations. At the first iteration, the SWT values begin to diverge, and by the second iteration each Scout SWT value has begun to move toward an accurate reflection of the rating acumen of each Scout, as defined above. By the $7^{th}$ iteration, after applying Equations (1), (3) and (4), (5) iteratively as described above, each SWT value has asymptotically approached its final value, which accurately reflects the rating acumen of each Scout.

The three perfect Scouts converge to a SWT value of 73.8 as indicated by a reference numeral 604. In a sense, a rating of 73.8 is a "perfect" rating in that it is the highest rating, and thus the ratings of these three Scouts carry the most weight in the crowd-sourced rating.

Note that it is difficult, if not impossible, for even a perfect scout to attain a perfect weighting factor of say 100, because others in the crowd are not equally perfect. Even though the weighting factors of other Scouts are much lower, they drive the crowd-sourced weighted average away from even the perfect scout. The crowd-source tells us the answer, but then scouts are matched against the answer, which further refines the answer, ad infinitum.

The three Scouts whose ratings are always within the +/−1 range converged to SWT values of 36.4, 38.8 and 41.3 as indicated by a reference numeral 606.

The two Scouts always off by 1 (i.e., 1 higher or 1 lower) from the true value converge to SWT values of 25.8 and 34.0 as indicated by a reference numeral 608.

The five Scouts within +2 and −2 of the true value, or giving a rating of between 3 and or between 4 and 6 within the true value, converged to SWT values from 16.9 to 23.2 as indicated by a reference numeral 610, with an average value of 19.6.

The seven remaining Scouts, including the two random Scouts, converged to SWT values between 4.8 and 11.0 (see reference numeral 612), with an average value of 7.99.

Thus, the data in FIG. 6 demonstrate that accurate Scouts (i.e. those with personnel evaluation acumen) earn higher Scout Weighting Factors, as compared to inaccurate Scouts, including for some cases more than one of order of magnitude (i.e., a factor of 10) (4.8 vs. 73.8) separating the best Scouts as designated by the reference numeral 604 from the worst Scouts as designated by the reference numeral 612.

FIG. 7 illustrates the evolution (as the number of rating iterations increases) of the corresponding 20 Players as evaluated by the 20 Scouts of FIG. 6. The Players are initially evaluated using what is effectively an Unweighted Overall Rating (UOA) rating per Equation (2), even though evaluated using Equation (1), because all Scouts start with the identical Scout Weighting Factor of 10 as illustrated in FIG. 6. As discussed above, therefore Equation (1) reduces identically to Equation (2).

The initial Overall Ratings (OR) of the 20 Players range from about 2.25 to 5.75, and when compared to the "true" Player ratings, the average error in evaluating the Players by the 20 Scouts is 20.4%, and the maximum error in rating any Player among the 20 Players is 130%. Because the simulation performed here is initiated with a "true" assumed rating, the error is readily evaluated by the difference between the true rating and the weighted Overall Rating, allowing direct calculation of the average error over the 20 players as well as the maximum error. This starting point illustrates the concept detailed above with crowdsourcing tending to pull Players ratings to the middle of the Rating Scale if no Scout Weighting Factors are used, resulting in a less accurate final rating for each Player.

Toward this end, FIG. 7 illustrates the accuracy introduced by using the Scout Weighting Factors (i.e., by rating the personnel evaluators) over 6 rating iterations. FIG. 7 separates the 20 Players into rating groups after the 6 iterations of Scout ratings and updating of the Scout Weighting Factors as discussed above in conjunction with FIG. 6.

As shown, the Players with true Ratings of 7 cluster near a Player Overall Rating (OR) value of 7 (as indicated by a reference numeral 704). The ratings do not converge exactly to 7 as such a result requires that all Scouts rate a Player with a 7. The Players with true Ratings of 6 cluster near a Player Overall Rating (OR) value of 6 (as indicated by a reference numeral 706), the Players with true Ratings of 5 cluster near a Player Overall Rating (OR) value of 5 (as indicated by a reference numeral 708), the Players with true Ratings of 4 cluster near a Player Overall Rating (OR) value of 4 (as indicated by a reference numeral 710), the Players with true Ratings of 3 cluster near a Player Overall Rating (OR) value of 3 (as indicated by a reference numeral 712), the Players with true Ratings of 2 cluster near a Player Overall Rating (OR) value of 2 (as indicated by a reference numeral 714), and the Players with true Ratings of 1 cluster near a Player Overall Rating (OR) value of 1 (as indicated by a reference numeral 716).

Following the $6^{th}$ iteration, noting the zeroth iteration is the simple unweighted average (i.e., since each SWT set to 10), the overall accuracy of the crowdsourcing algorithm is significantly improved, with an overall average error in evaluating Players by the 20 Scouts now reduced to only 9.1%, a more than two-fold improvement from the simple unweighted average. The maximum error is also reduced more than two-fold to 66.5%.

FIGS. 8 and 9 illustrate a second exemplary embodiment of the current invention using the 7-point rating scale (i.e., 1 to 7) in combination with a two-decade logarithmic scale for evaluating the Scouts, as described in Equations (1) to (5) above.

In this example, an array of 20 Scouts and 20 Players is created, with Players randomly assigned Overall Ratings (i.e., personnel evaluations) on the scale of 1 to 7, using only integer values. These randomly assigned ratings may be considered the "true" Rating of each Player.

As with the first example, the 20 Scouts are then assigned various levels of evaluating acumen, for example, five Scouts are defined as "perfect" Scouts, in that they rate each of the 20 Players perfectly. In other words, their rating is set to match the "true" Rating of each Player.

Three Scouts are defined to randomly be between +1 or −1 of the "true" rating, meaning if the true rating was 4, each of these Scouts would rate the Player as either 3, 4 or 5, with the outcome determined randomly.

Two Scouts are defined as either always 1 higher than the true Rating or always 1 lower than the true Rating. Hence if a Player had a true Rating of 5, one of these Scouts would rate the Player a 4, and one would rate the Player a 6.

Finally, ten Scouts were designated to provide a totally random rating between 1 and 7. To begin, each Scout received a Scout Log Weighting Factor of 1, which corresponds to a Scout Weighting Factor of 10.

FIG. 8 illustrates the evolution of the Scout Weighting Factors (SWT) over 7 iterations of evaluating the Scout performance, with all 20 Scouts beginning with a SWT of 10 initially as indicated by a reference numeral 802 corresponding to zero iterations. By the second iteration Scout SWT values are changing to reflect the actual rating acumen of each Scout, as defined above, and by the $7^{th}$ iteration, as applying Equations (3) to (5), each SWT value has asymptotically approached its final value.

The five perfect Scouts converge to a SWT value of 78.8 (as indicated by a reference numeral 804); the three +/−1 Scouts converged to SWT values of 40.0 to 47.0 (as indicated by a reference numeral 806); with an average value of 42.5.

The two Scouts always off by 1 converged to an average SWT value 29.6 (as indicated by a reference numeral 808).

The 10 Scouts defined as randomly rating Players converged to SWT values between 3.29 and 12.9 (as indicated by a reference numeral 810), with an average value of 7.0.

The data in FIG. 8 demonstrates that accurate Scouts (i.e., those with personnel evaluation acumen) earn higher Scout Weighting Factors, as compared to inaccurate Scouts, with for some cases more than a factor of 20 (3.29 vs. 78.8) separating the best Scouts (as indicated by the reference numeral 804), from the worst Scouts (as indicated by a reference numeral 810), or a factor of 24 times.

FIG. 9 illustrates the evolution of the corresponding 20 Players as evaluated by the 20 Scouts of FIG. 8. The Players are initially evaluated using what is effectively an Unweighted Overall Rating (UOA) rating per Equation (2), even though actually evaluated using Equation (1), because all Scouts start with the identical Scout Weighting Factor of 10 (see reference numeral 802 in FIG. 8), as discussed above, and therefore Equation (1) reduces identically to Equation (2). The Overall Ratings (OR) of the 20 Players ranges from about 2.3 to 5.6 initially, and when compared to the "true" Player ratings, the average error in evaluating the Players by the 20 Scouts is 25%, and the maximum error in rating any Player among the 20 is 130%.

This starting point illustrates the concept detailed above with crowdsourcing tending to pull Players ratings to the middle of the Rating Scale if no Scout Weighting Factors are used, resulting in less accurate Player ratings. Toward this end, FIG. 9 illustrates the accuracy introduced by using the Scout Weighting Factors (i.e., by rating the personnel evaluators), showing a separation of the 20 Players into rating groupings after 6 iterations of rating the Scouts and updating the Scout Weighting Factors as discussed above in conjunction with FIG. 8.

As shown, the Players with true Ratings of 7 cluster near a Player Overall Rating (OR) value of 7 (as indicated by a reference numeral 904); the Players with true Ratings of 6 cluster near a Player Overall Rating (OR) value of 6 (as indicated by a reference numeral 906); the Players with true Ratings of 5 cluster near a Player Overall Rating (OR) value of 5 (as indicated by a reference numeral 908), the Players with true Ratings of 4 cluster near a Player Overall Rating (OR) value of 4 (as indicated by a reference numeral 910); the Players with true Ratings of 3 cluster near a Player Overall Rating (OR) value of 3 (as indicated by a reference numeral 912); the Players with true Ratings of 2 cluster near a Player Overall Rating (OR) value of 2 (as indicated by a reference numeral 914), and the Players with true Ratings of 1 cluster near a Player Overall Rating (OR) value of 1 (as indicated by a reference numeral 916), Following the $6^{th}$ iteration, noting the zeroth iteration is the simple unweighted average (i.e. each SWT set to 10), the overall accuracy of the crowdsourcing algorithm is significantly improved, with an overall average error in evaluating Players by the 20 Scouts now reduced to only 5.9%, a more than four-fold improvement from the simple unweighted average. The maximum error is also reduced more than three-fold to 36.7%.

The above examples are not considered as limiting, but are intended to show the utility of the proposed crowdsourcing approach to personnel evaluation using an approach of weighted averages of the individual evaluator ratings (i.e., the crowdsourcers) using a feedback approach by iteratively comparing the individual evaluator acumen to the overall weighted crowd-sourced personnel evaluations.

The above examples also show the utility of the logarithmic approach to assessing the accuracy of individual Scouts in combination with a linear mapping through the log-scale, as the convergence of Scout Weighting Factors is rapid (See FIGS. 6 and 8), thereby ensuring not only accurate crowdsourcing but fast convergence rates.

Figure 10:
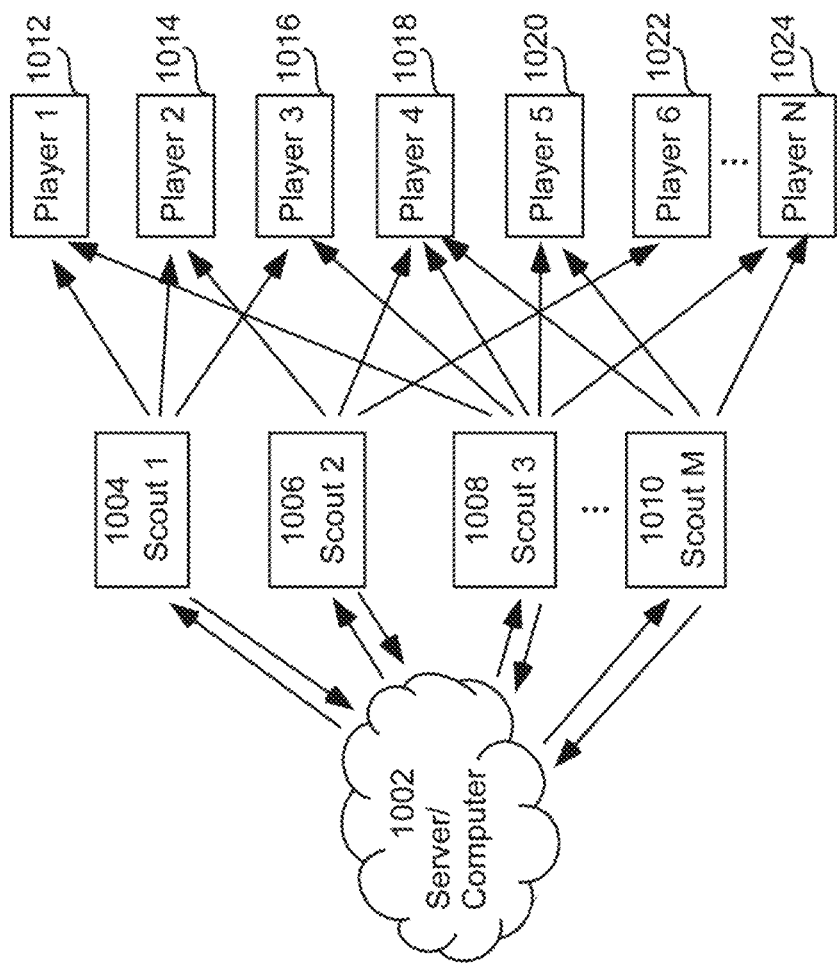
FIG. 10 illustrates the concept of a crowdsourcing approach to personnel evaluation, in which "Scouts" evaluate "Players", where Scouts may be assigned specific Players.

Other methods may be used to further improve the accuracy of the crowdsourcing algorithm, such as the assignment of Players to various Scouts, as illustrated in FIG. 10. Consider the controlling server and host computer systems 1002 in combination with a network of M Scouts and N Players to be evaluated. Scouts may be assigned to evaluate specific Players, for example, Scout 1 (designated by a reference numeral 1004), may be assigned to rate Player 1 (designated by a reference numeral 1012), Player 2 (designated by a reference numeral 1014), and Player 3 (designated by a reference numeral 1016).

Scout 2 (designated by a reference numeral 1006), may be assigned to rate Player 2 (designated by a reference numeral 1014), Player 4 (designated by a reference numeral 1018), and Player 6 (designated by a reference numeral 1022).

Scout 3 (designated by a reference numeral 1008), may be assigned to rate Player 1 (designated by a reference numeral 1012), Player 3 (designated by a reference numeral 1016), Player 4 (designated by a reference numeral 1018), Player 5 (designated by a reference numeral 1020), and Player N (designated by a reference numeral 1024).

Scout M (designated by a reference numeral 1010), may be assigned to rate Player 4 (designated by a reference numeral 1018), Player 5 (designated by a reference numeral 1020), and Player N (designated by a reference numeral 1024).

With such a scenario as described above and illustrated with FIG. 10, the assignment of Scouts may be made using many different models or combinations of models. For example, Scouts may be assigned Players such that each Scout evaluates some minimum threshold of Players; or Scouts may be assigned such that each Player is ensured to be evaluated by some minimum number of Scouts; or Scouts may be assigned Players to evaluate that are members of a visiting team (i.e., a team not generally associated with a Scout's home venue); or Scouts may be assigned Players based on the Player's position as compared to the Scout's ability (i.e., acumen or accuracy) at evaluating such a position(s). Such examples are not considered to be limiting, and any number of approaches for assigning Scouts and Players are available for those skilled in the art of automated assignments, mapping, optimal network configuration, and the like.

Furthermore, it is expected that Scouts may self-select Players to evaluate, based on personal preferences, home teams, personal experiences, Players that "catch their attention" during a game, Players who are mentioned by friends or other Scouts, Players followed by local media outlets, or the like.

In general, Scouts may be able to update their evaluation of a specific Player, and any number of approaches for accommodating such an update is envisioned. For example, the Scout's prior rating may be replaced by the new rating, or the Scout's new rating may become an average of the original and new rating, or some weighted average of the original and new rating. Such examples are not to be considered as limiting, with many such approaches possible as available to those skilled in the art of averaging multiple inputs.

It is important to consider the potential of a Scout to attempt to manipulate his or her Scout Weighting Factor by updating their own ratings of given Players as they determine a Player or Players Overall Ratings. Such potential is mitigated by making use of the Scout's original rating or ratings as described above, or by limiting knowledge of Player Overall Ratings to individual Scouts.

In general, Scouts may communicate with other Scouts and form social networks of Scouts, for example, with friends or companions, especially friends or companions that frequent the same events or venues. For examples, a group of Scouts may attend the same high school stadium each week and sit together, and such Scouts may link to each other through the central server and communicate about upcoming events or certain Players.

Although described primarily in the context of Sports, Players and Recruiters, and to a lesser extent as related to musicians, models and actors, the concepts of the invention can be applied to other circumstances involving evaluation of a person. But generally, as can be inferred from the above discussion of the details of the invention, the inventive concepts are most applicable to situations that involve a fan base and a recruitment "market."

Figure 11:
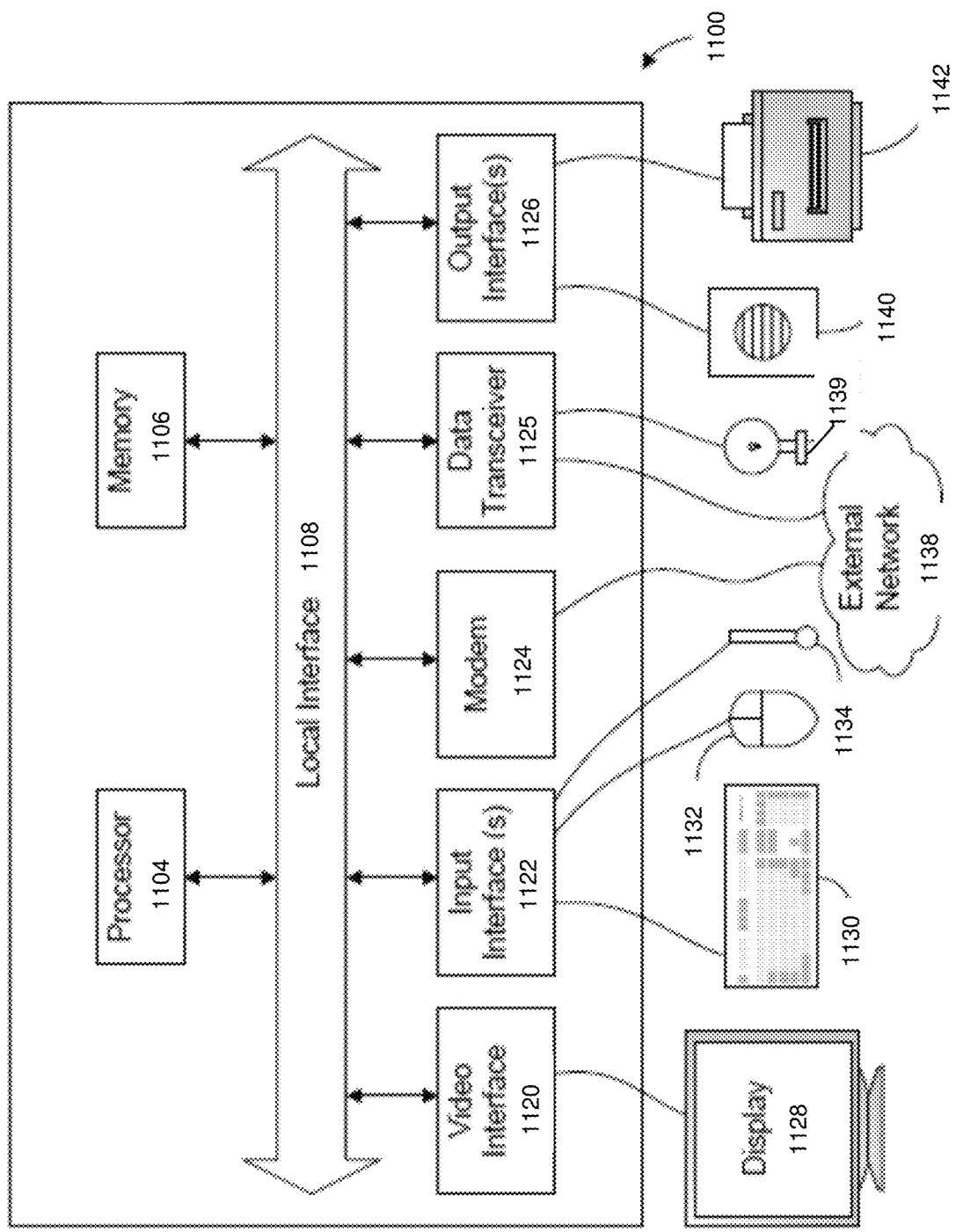
FIG. 11 illustrates a computer system for use in practicing the invention.

FIG. 11 illustrates a computer system 1100 for use in practicing the invention. The system 1100 can include multiple remotely-located computers and/or processors and/or servers (not shown). The computer system 1100 comprises one or more processors 1104 for executing instructions in the form of computer code to carry out a specified logic routine that implements the teachings of the present invention. The computer system 1100 further comprises a memory 1106 for storing data, software, logic routine instructions, computer programs, files, operating system instructions, and the like, as is well known in the art. The memory 1106 can comprise several devices, for example, volatile and non-volatile memory components further comprising a random-access memory RAM, a read only memory ROM, hard disks, floppy disks, compact disks including, but not limited to, CD-ROM, DVD-ROM, and CD-RW, tapes, flash drives, cloud storage, and/or other memory components. The system 1100 further comprises associated drives and players for these memory types.

In a multiple computer embodiment, the processor 1104 comprises multiple processors on one or more computer systems linked locally or remotely. According to one embodiment, various tasks associated with the present invention may be segregated so that different tasks can be executed by different computers/processors/servers located locally or remotely relative to each other.

The processor 1104 and the memory 1106 are coupled to a local interface 1108. The local interface 1108 comprises, for example, a data bus with an accompanying control bus, or a network between a processor and/or processors and/or memory or memories. In various embodiments, the computer system 1100 further comprises a video interface 1120, one or more input interfaces 1122, a modem 1124 and/or a data transceiver interface device 1125. The computer system 1100 further comprises an output interface 1126. The system 1100 further comprises a display 1128. The graphical user interface referred to above may be presented on the display 1128. The system 1100 may further comprise several input devices (some which are not shown) including, but not limited to, a keyboard 1130, a mouse 1132, a microphone 1134 a digital camera, smart phone, a wearable device, and a scanner (the latter four not shown). The data transceiver 1125 interfaces with a hard disk drive 1139 where software programs, including software instructions for implementing the present invention are stored.

The modem 1124 and/or data receiver 1125 can be coupled to an external network 1138 enabling the computer system 1100 to send and receive data signals, voice signals, video signals and the like via the external network 1138 as is well known in the art. The system 1100 also comprises output devices coupled to the output interface 1126, such as an audio speaker 1140, a printer 1142, and the like.

Figure 12:
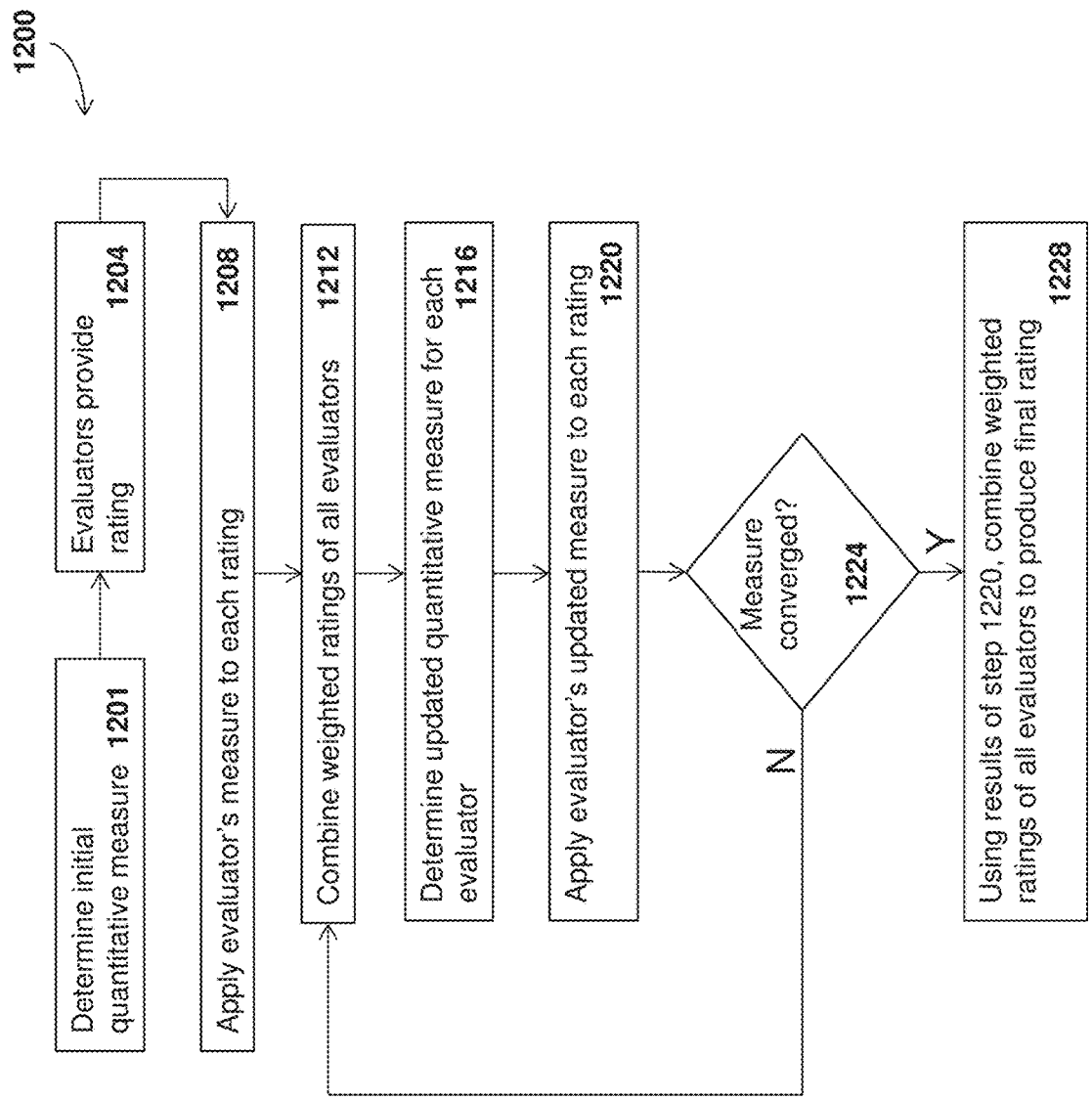
FIG. 12 illustrates a flow chart, for processing by the computer system of FIG. 11, implementing the invention.

FIG. 12 is a flow chart 1200 for implementation by the computer system 1100 of FIG. 11. The flowchart 1200 begins at a step 1201 where an initial quantitative measure (e.g., a weight) is determined or assigned for each evaluator. Preferably, at this stage of the process and to simplify the arithmetic, each evaluator is assigned the same quantitative measure (e.g., numerical value). At a step 1204 each evaluator provides a rating for each person in a pool of persons to be evaluated, perhaps as to an attribute of athletic talent or an attribute related to an artistic endeavor (e.g., acting, painting) of each person.

At a step 1208 the initial quantitative measure (weight) is applied to each rating. Since each evaluator has been given or assigned a weight value, the weight of a respective evaluator is applied to the ratings of that evaluator.

At a step 1212 the weighted ratings of all evaluators are combined.

At a step 1216 an updated weight or quantitative measure is determined for each evaluator. Equations (1) to (5) above (or other suitable equations) are employed to determine this updated weight.

Then at a step 1220 the updated weight or quantitative measure is applied to the initial ratings provided at the step 1204.

At a decision step 1224 the weight values are analyzed to determine if they are converging (that is, independently converging for each evaluator) asymptotically toward a final value. The user of the system must determine if that convergence has occurred, generally by reviewing the weights determined at each iteration, the resulting trend of those weight values, and the differentials determined for each successive iteration. The user will select a differential value that suggests additional iterations will not significantly affect the results.

If the result from the decision step 1224 is negative, processing returns to the step 1212 for another iteration through the steps associated with updating the weight value for each evaluator.

If the result from the decision step 1224 is positive, then the final rating is calculated at a step 1228, using the initial ratings of each evaluator, applying the last-calculated weight value, and combining all the weighted values to reach the final composite rating.

Other techniques for determining the number of iterations may depend on the nature of the evaluation. For the example of football, an iteration may correspond to each week of the football season. A final rating can be calculated, based on a crowdsourced rating of several evaluators as determined according to the present invention, at the conclusion of game 1. This rating is then carried over to game 2 and serves as the initial rating for the game 2 evaluations. This process continues by carrying over the evaluation at the end of each game until the last game of the season, at which point the final evaluation represents the player's performance in each of the games during the season.

Additionally, weighting factors of a given evaluator may be carried forward from game to game or from season to season, resulting in increased accuracy with time.

In certain applications, the weighting factors of the evaluators may be periodically reset, such as for evaluating contestants in talent contests.

The results of the present invention can be particularly advantageous when presented in the form of a data structure, such as a spread sheet. Fields of the data structure may include: an identifier field (e.g. name of the evaluee), an industry field (e.g. sports, theater, etc. of the evaluee), an updated weighted-average rating field, and a field indicating the number of evaluators used to derive the updated weighted-average rating. Such a data structure is novel since this type of data has not previously been stored in such a format. Data stored in the format can be easily browsed by anyone interested in recruiting the evaluee, such as a team owner. Further, this technique for finding talent is more efficient and less expensive than employing recruiters to travel the country in search of talented individuals.

This Detailed Description is therefore not to be taken or considered in a limiting sense, and the appended claims, as well as the full range of equivalent embodiments to which such claims are entitled define the scope of various embodiments. This disclosure is intended to cover any and all adaptations, variations, or various embodiments. Combinations of presented embodiments, and other embodiments not specifically described herein by the descriptions, examples, or appended claims, may be apparent to those of skill in the art upon reviewing the above description and are considered part of the current invention.

What is claimed is:

1. A method, using a processor of a device, for determining a final quantitative measure for each evaluator j, wherein a quantitative measure represents a rating acumen of each evaluator, wherein evaluators with a higher final quantitative measure are considered better evaluators than those with a lower quantitative measure, the final quantitative measure of an evaluator used for determining a final rating by the evaluators of an evaluee, the method comprising:

(a) a plurality of evaluators and a plurality of evaluees each using a network connected device for uploading and downloading information to a server, wherein evaluator information comprises evaluator personal information, and wherein evaluee information comprises evaluee performance statistics, metrics, and media, wherein using the network connected device each evaluator can access the server to review the performance statistics, the metrics, and the media of each evaluee;

(b) displaying a graphical user interface on the device, each evaluator j providing an unweighted rating of an evaluee using the graphical user interface, the unweighted ratings stored in memory, wherein an evaluator j may provide an unweighted rating of same evaluees and/or of different evaluees as another evaluator j, wherein the evaluators j and the evaluees i are distributed over a geographic area thereby requiring use of the network-connected device, wherein the evaluators j can provide their unweighted ratings at different times and of different evaluees, the unweighted rating of an evaluee related to a skill or to an athletic or performance related attribute of the evaluee;

(c) assigning an initial quantitative measure to each evaluator j without consideration of the rating acumen of the evaluator j, wherein the initial quantitative measure is stored in memory;

(d) applying the initial quantitative measure for each evaluator j, as assigned at step (c), to the respective unweighted rating of each evaluee i by each evaluator j, as provided at step (b), to generate an initial weighted rating of each evaluee i by each evaluator j, wherein the initial weighted ratings of all evaluees i by all evaluators j are stored in a memory;

(e) summing the initial weighted ratings of all evaluators j for each evaluee i and normalizing a resultant sum by dividing by a sum of the initial quantitative measures of all evaluators j who evaluated the each evaluee i to generate an initial overall rating of each evaluee i, the initial overall rating of an evaluee considered an initial crowd-sourced rating of the evaluee;

(f) for each evaluator j, determining an absolute value of a differential between the unweighted rating by each evaluator j of each evaluee i, as provided at step (b), and the initial overall rating of each evaluee i, as determined at step (e), and summing the absolute values for each evaluator j over all evaluees i, as assessed by evaluator j, to generate a sum for each evaluator j, assigning an updated quantitative measure to each evaluator j based on the sum for the respective evaluator j;

(g) applying the respective updated quantitative measure for each evaluator j, as assigned at step (f), to the respective unweighted rating of each evaluee i, by each evaluator j, as provided at step (b), to generate an updated weighted rating of each evaluee i by each evaluator j;

(h) summing the updated weighted ratings of each evaluee i by all evaluators j, as determined at step (g), and normalizing a resultant sum by dividing by a sum of the updated quantitative measures of all evaluators j who evaluated the each evaluee i to generate an updated overall rating of each evaluee i, the updated overall rating of an evaluee considered a more accurate crowd-sourced rating of the evaluee than the initial overall rating of the evaluee;

(i) for each evaluator j, determining an absolute value of a differential between the unweighted rating by each evaluator j of each evaluee i, as provided at step (b), and the updated overall rating of each evaluee i, as determined at step (h), and summing the absolute values for each evaluator j over all evaluees i to generate a sum for each evaluator j, assigning an updated quantitative measure to each evaluator j based on the sum for the respective evaluator j;

(j) to increase an accuracy of each updated quantitative measure for each evaluator j and thereby a more accurate rating of each evaluee i, repeating steps (g) through (i), wherein each iteration through steps (g) through (i) generates another updated quantitative measure for each evaluator j that is used for the next iteration, wherein repeating steps (g) through (i) iteratively converges the updated quantitative measure such that a differential between two most recent updated quantitative measures for an evaluator j is less than a predetermined value, or repeating steps (g) through (i) a predetermined number of iterations, wherein a most recent updated quantitative measure is referred to as a final quantitative measure when the differential is less than the predetermined value or when the steps (g) through (i) have been repeated the predetermined number of iterations, wherein the final quantitative measure of an evaluator j represents a rating acumen of evaluator j; and (k) after determining the final quantitative measure of each evaluator j according to step (j), applying the final quantitative measure of each evaluator j to the unweighted rating of an evaluee i as provided by the evaluator j, wherein use of the final quantitative measure of an evaluator in conjunction with evaluation of an evaluee provides a more accurate crowd-sourced evaluation of the evaluee i, and wherein the final quantitative measure is available for future use in conjunction with future evaluations by the evaluator j, wherein the evaluation is related to a skill or to an athletic or performance related attribute of an evaluee;

(l) as additional evaluators j, additional evaluees i, and/or additional ratings are entered into the network via the network of connected devices, steps (b) to (k) may be repeated, thereby dynamically responding to the crowd-sourcing population of evaluators and evaluees.

2. The method of claim 1, further comprising a step (m) of multiplying the final quantitative measure for evaluator j, as determined at step (j) of claim 1, and the unweighted rating by the respective evaluator j, as provided at step (b) of claim 1, to determine a final overall rating by evaluator j of each evaluee i, and combining the final overall ratings of all evaluators j to generate the final overall rating of each evaluee i.

3. The method of claim 2 further comprising:
(n) forming a data structure for each evaluee i including a first field indicating a final overall rating of each evaluee i; and
(o) at least one of transmitting and receiving at least one of the initial quantitative measure of each evaluator j, the final quantitative measure of each evaluator j, the final overall rating by each evaluator j, the predetermined value, the predetermined number of iterations, and the final overall rating of each evaluee i, the final overall rating of each evaluee i for receiving by a recruiter for determining whether to recruit an evaluee i.

4. The method of claim 2 wherein the final overall rating of each evaluee i is related to a skill or to an athletic or a performance-related attribute of an evaluee i.

5. The method of claim 1 wherein the initial quantitative measure, the updated quantitative measure, and the final quantitative measure each comprise a weight.

6. The method of claim 1 wherein the initial quantitative measure is identical and non-zero for each evaluator j.

7. The method of claim 1 wherein steps (g) through (i) are repeated a number of times between 1 and 100.

8. The method of claim 1 wherein each evaluee i participates in a plurality of events over a time interval, and wherein the final overall rating is determined for each one of the plurality of events and carried over to a last one of the plurality of events, resulting in a final overall rating through the last one of the plurality of events.

9. The method of claim 1 wherein each evaluator j comprises a scout and an evaluee i comprises a player in a sport, the method further comprising each scout evaluating a predetermined number of players.

10. The method of claim 1 wherein each evaluator j comprises a scout and an evaluee i comprises a player in a sport, the method further comprising assigning scouts such that the player is evaluated by a predetermined number of scouts.

11. The method of claim 1 wherein one or more evaluators j comprise a home-team scout or a neutral scout, and an evaluee i comprises a visiting-team player or a home-team player, the method further comprising assigning a home-team scout or a neutral scout to one or more visiting-team players.

12. The method of claim 1 wherein at least one evaluator j comprises a skilled scout having evaluation skills related to a specific athletic position played by an evaluee i or related to a specific performance-related attribute of an evaluee i, the method further comprising assigning the skilled scout to an evaluee i who plays the specific athletic position or who demonstrates the specific performance-related attribute.

13. The method of claim 1 wherein an evaluator j is assigned to an evaluee i based on attributes of the evaluator and attributes of the evaluee i.

14. The method of claim 1 wherein the device is at least one of a computer, a computer server, a plurality of networked, central, or cloud-based computers, a mobile device, a cell phone, a smart phone, a tablet device, a laptop device, and a wearable electronic device, as controlled by a computer-readable program.

15. The method of claim 1 wherein the unweighted rating comprises a value selected from a rating scale, the rating scale comprising one of a linear rating scale, a logarithmic rating scale, a power-law rating scale, an exponential rating scale, or any combination thereof.

16. The method of claim 1 wherein each updated quantitative measure is mapped to a quantitative measure scale.

17. The method of claim 16 wherein the quantitative measure scale comprises a logarithmic scale, a linear scale or a combination of logarithmic and linear scales.

18. The method of claim 1 further comprising determining the initial overall rating of an evaluee i, according to step (e), and the updated overall rating of an evaluee i, according to step (h), by applying an equation:

$$OR_i = \frac{\sum_{j=1}^{N} SR_{ji} \cdot SWT_j}{\sum_{j=1}^{N} SWT_j}$$

wherein i denotes an evaluee, $OR_i$ is the initial overall rating or the updated overall rating of evaluee i, $SR_{ji}$ is the unweighted rating by evaluator j of evaluee i, and $SWT_j$ is the initial quantitative measure or the updated quantitative measure for evaluator j.

19. The method of claim 1 wherein assigning an updated quantitative measure according to step (f) further comprises:
determining an evaluator differential rating $SDR_j$ of evaluator j by applying an equation:

$$SDR_j = \frac{\sum_{i=1}^{M} \text{Abs}(SR_{ji} - OR_i)}{M}$$

wherein M = a number of evaluees i to be evaluated, $SR_{ji}$ is the unweighted rating by evaluator j of an evaluee i, and $OR_i$ is the initial overall rating or the updated overall rating of an evaluee i;
determining the updated quantitative measure for each evaluator j by applying the equation:

$$SLWT_j = 2 \cdot [1 - (SDR_j/SFP)]$$

wherein $SLWT_j$ is an evaluator log weighting factor of evaluator j, $SDR_j$ is the evaluator differential rating of evaluator j, and SFP is a scale factor point on a rating scale between a highest rating value and a lowest rating value; and $$SWT_j = 10^{SLWT_j}$$

where $SWT_j$ is the quantitative measure for evaluator j for a logarithmic scale of two decades.

20. The method of claim 1, further comprising assigning an evaluator j to a plurality of evaluees i.

21. The method of claim 1, further comprising an evaluator j self-assigning to one more evaluees i or a third party assigning an evaluator j to one or more evaluees i.

22. The method of claim 1, wherein the evaluees i participate in a sport during a first season of sporting events, and wherein step (k) further comprises using the final quantitative measure of an evaluator j during a second season of sporting events.

23. The method of claim 1, accessing evaluee information by one or more recruiters of evaluees.

24. The method of claim 1, wherein the evaluator performance information comprises one or more of high school stadiums or venues frequently visited, sports or sports events of interest, digital media, the final quantitative measure of the evaluator, and personal contact information.

* * * * *